(12) United States Patent
Inoshita

(10) Patent No.: US 11,423,647 B2
(45) Date of Patent: Aug. 23, 2022

(54) IDENTIFICATION SYSTEM, MODEL RE-LEARNING METHOD AND PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 111 days.

(21) Appl. No.: 17/053,413

(22) PCT Filed: May 7, 2018

(86) PCT No.: PCT/JP2018/017611
§ 371 (c)(1),
(2) Date: Nov. 6, 2020

(87) PCT Pub. No.: WO2019/215780
PCT Pub. Date: Nov. 14, 2019

(65) Prior Publication Data
US 2021/0224537 A1    Jul. 22, 2021

(51) Int. Cl.
*G06V 20/10* (2022.01)
*G06N 20/00* (2019.01)

(52) U.S. Cl.
CPC ............. *G06V 20/10* (2022.01); *G06N 20/00* (2019.01)

(58) Field of Classification Search
CPC .... G06V 20/10; G06V 2201/08; G06V 10/25; G06N 20/00; G06N 3/0454; G06N 3/08; G06K 9/6263
See application file for complete search history.

(56) References Cited

U.S. PATENT DOCUMENTS

| 2015/0051909 | A1* | 2/2015 | Tachioka | G10L 15/063 |
| | | | | 704/243 |
| 2018/0357539 | A1* | 12/2018 | Hwang | G06N 3/082 |
| 2019/0130659 | A1* | 5/2019 | Ide | G07C 5/006 |
| 2019/0392270 | A1* | 12/2019 | Pham | G06K 9/6288 |
| 2020/0374286 | A1* | 11/2020 | Agarwal | G06V 40/20 |
| 2021/0097354 | A1* | 4/2021 | Amato | G06V 40/10 |

(Continued)

FOREIGN PATENT DOCUMENTS

| JP | 2012-043225 A | 3/2012 |
| JP | 2015-176175 A | 10/2015 |

(Continued)

OTHER PUBLICATIONS

International Search Report of PCT/JP2018/017611 dated Jul. 10, 2018 [PCT/ISA/210].

(Continued)

*Primary Examiner* — Lewis G West
(74) *Attorney, Agent, or Firm* — Sughrue Mion, PLLC

(57) ABSTRACT

Learning means 701 learns a model for identifying an object indicated by data by using training data. First identification means 702 identifies the object indicated by the data by using the model learned by the learning means 701. Second identification means 703 identifies the object indicated by the data as an identification target used by the first identification means 702 by using a model different from the model learned by the learning means 701. The learning means 701 re-learns the model by using the training data including the label for the data determined based on the identification result derived by the second identification means 703 and the data.

11 Claims, 13 Drawing Sheets

(56) References Cited

U.S. PATENT DOCUMENTS

2022/0058522 A1\* 2/2022 Yokoyama ........... G06K 9/6256
2022/0083548 A1\* 3/2022 Thiyagarajan ...... G06F 16/2358

FOREIGN PATENT DOCUMENTS

| JP | 2016-015116 A | 1/2016 |
| JP | 2016-522459 A | 7/2016 |
| JP | 2016-180918 A | 10/2016 |
| JP | 2017-117139 A | 6/2017 |
| JP | 2019-512827 A | 5/2019 |
| WO | 2016/147653 A1 | 9/2016 |

OTHER PUBLICATIONS

Japanese Office Action far JP Application No. 2020-517632 dated Oct. 12, 2021 with English Translation.

\* cited by examiner

FIG. 9

| RELIABILITY OF EACH LABEL WHEN EXTERNAL GENERATION MODEL A IS USED | | SIMILARITY CALCULATED FOR EXTERNAL GENERATION MODEL A | | PRODUCT |
|---|---|---|---|---|
| AUTOMOBILE | 0.1 | × 0.9 | = | 0.09 |
| MOTORCYCLE | 0.7 | × 0.9 | = | 0.63 |
| BUS | 0.1 | × 0.9 | = | 0.09 |
| BACKGROUND | 0.1 | × 0.9 | = | 0.09 |

| RELIABILITY OF EACH LABEL WHEN EXTERNAL GENERATION MODEL B IS USED | | SIMILARITY CALCULATED FOR EXTERNAL GENERATION MODEL B | | PRODUCT |
|---|---|---|---|---|
| AUTOMOBILE | 0.1 | × 0.8 | = | 0.08 |
| MOTORCYCLE | 0.6 | × 0.8 | = | 0.48 |
| BUS | 0.2 | × 0.8 | = | 0.16 |
| BACKGROUND | 0.1 | × 0.8 | = | 0.08 |

AVERAGE VALUE
AUTOMOBILE 0.085
MOTORCYCLE 0.555
BUS 0.125
BACKGROUND 0.085

FIG. 10

RELIABILITY OF EACH LABEL WHEN EXTERNAL GENERATION MODEL A IS USED

| | | | RATIO OF SIMILARITY CORRESPONDING TO EXTERNAL GENERATION MODEL A TO TOTAL SUM OF SIMILARITIES (WEIGHT) | | PRODUCT |
|---|---|---|---|---|---|
| AUTOMOBILE | 0.1 | × | (0.9/1.7) | = | 0.0529 |
| MOTORCYCLE | 0.7 | × | (0.9/1.7) | = | 0.3705 |
| BUS | 0.1 | × | (0.9/1.7) | = | 0.0529 |
| BACKGROUND | 0.1 | × | (0.9/1.7) | = | 0.0529 |

RELIABILITY OF EACH LABEL WHEN EXTERNAL GENERATION MODEL B IS USED

| | | | RATIO OF SIMILARITY CORRESPONDING TO EXTERNAL GENERATION MODEL B TO TOTAL SUM OF SIMILARITIES (WEIGHT) | | PRODUCT |
|---|---|---|---|---|---|
| AUTOMOBILE | 0.1 | × | (0.8/1.7) | = | 0.0470 |
| MOTORCYCLE | 0.6 | × | (0.8/1.7) | = | 0.2823 |
| BUS | 0.2 | × | (0.8/1.7) | = | 0.0941 |
| BACKGROUND | 0.1 | × | (0.8/1.7) | = | 0.0470 |

SUM
- AUTOMOBILE 0.0999
- MOTORCYCLE 0.6528
- BUS 0.1470
- BACKGROUND 0.0999

US 11,423,647 B2

IDENTIFICATION SYSTEM, MODEL RE-LEARNING METHOD AND PROGRAM

CROSS REFERENCE TO RELATED APPLICATIONS

This application is a National Stage of International Application No. PCT/JP2018/017611, filed May 7, 2018.

TECHNICAL FIELD

The present invention relates to an identification system that identifies an object indicated by data by applying the data to a model, a model re-learning method and a model re-learning program applied to the identification system.

BACKGROUND ART

An example of a general identification system is described below. In the general identification system, a model is learned in advance by machine learning by using a group of an image captured by a camera included in the identification system and a label indicating an object appearing in the image as training data. The general identification system identifies the object appearing in the image by applying an image newly captured by the camera to the model.

Such a general identification system is used for preventing crimes in advance by detecting suspicious vehicles or suspicious persons, or is used for supporting a user of a white cane or a wheelchair by detecting and guiding the user of the white cane or the wheelchair.

Although the identification system that identifies the object appearing in the image has been described as an example, an identification system that identifies an object indicated by audio data is considered as the general identification system. Hereinafter, the identification system that identifies the object appearing in the image will be described as an example.

PTL 1 describes an image recognition method for avoiding the lengthening of additional learning due to a difference in a capturing environment. The image recognition method described in PTL 1 is an image recognition method in a camera system including a plurality of camera devices. In the image recognition method described in PTL 1, a first image and first capturing environment information are acquired from a first camera device. A first recognition control parameter indicating a first detector function corresponding to a capturing environment which is the same as or similar to the first capturing environment indicated by the first capturing environment information is selected by using a parameter table that manages capturing environment information indicating each capturing environment when each camera device captures an image in the past and each recognition control parameter indicating each detector function corresponding to each capturing environment. The first image acquired from the first camera device is recognized by using the first detector function indicated by the first recognition control parameter.

CITATION LIST

Patent Literature

PTL 1: Japanese Patent Laid-Open No. 2016-15116

SUMMARY OF INVENTION

Technical Problem

It is considered that the above-mentioned general identification system is provided in plural and the camera of each identification system is installed at each location.

Here, there are some cases where the appearance of the objects in the images captured by one camera varies. For example, it is assumed that one camera has many opportunities to capture automobiles traveling in a direction from a right side to a left side as viewed from the camera but has little opportunity to capture automobiles traveling in the opposite direction. In this case, many images on which the automobiles traveling in the direction from the right side to the left side appear are obtained, but few images on which the automobiles traveling in the opposite direction appear are obtained. Thus, the training data includes many images on which the automobiles traveling in the direction from the right side to the left side appear and includes only few images on which the automobiles traveling in the opposite direction appear. As a result, the identification system identifies the automobile with high accuracy when an image on which the automobile traveling in the direction from the right side to the left side appears is applied to the model obtained by machine learning using the training data, but has low identification accuracy of the automobile when an image on which the automobile traveling in the opposite direction appears is applied to the model.

Therefore, an object of the present invention is to provide an identification system capable of re-learning a model so as to improve identification accuracy of a model for identifying an object indicated by data, and a model re-learning method and a model re-learning program applied to the identification system.

Solution to Problem

An identification system according to the present invention includes learning means for learning a model for identifying an object indicated by data by using training data, first identification means for identifying the object indicated by the data by using the model learned by the learning means, and second identification means for identifying the object indicated by the data as an identification target used by the first identification means by using a model different from the model learned by the learning means. The learning means re-learns the model by using training data including a label for the data determined based on an identification result derived by the second identification means and the data.

A model re-learning method according to the present invention includes learning a model for identifying an object indicated by data by using training data, executing first identification processing of identifying the object indicated by the data by using the model, executing second identification processing of identifying the object indicated by the data as an identification target used in the first identification processing by using a model different from the model, and re-learning the model by using training data including a label for the data determined based on an identification result derived in the second identification processing and the data.

A model re-learning program according to the present invention causes a computer to execute learning processing of learning a model for identifying an object indicated by data by using training data, first identification processing of identifying the object indicated by the data by using the model learned in the learning processing, second identification processing of identifying the object indicated by the data as an identification target used in the first identification processing by using a model different from the model learned in the learning processing, and re-learning processing of re-learning the model by using training data including a label for the data determined based on an identification result derived in the second identification processing and the data.

Advantageous Effects of Invention

According to the present invention, it is possible to re-learn a model so as to improve identification accuracy of a model for identifying an object indicated by data.

BRIEF DESCRIPTION OF DRAWINGS

FIG. 9 It depicts an explanatory diagram illustrating a specific example of a first calculation method.

FIG. 10 It depicts an explanatory diagram illustrating a specific example of a second calculation method.

DESCRIPTION OF EMBODIMENTS

Hereinafter, exemplary embodiments of the present invention will be described with reference to the drawings.

First Exemplary Embodiment

Figure 1:
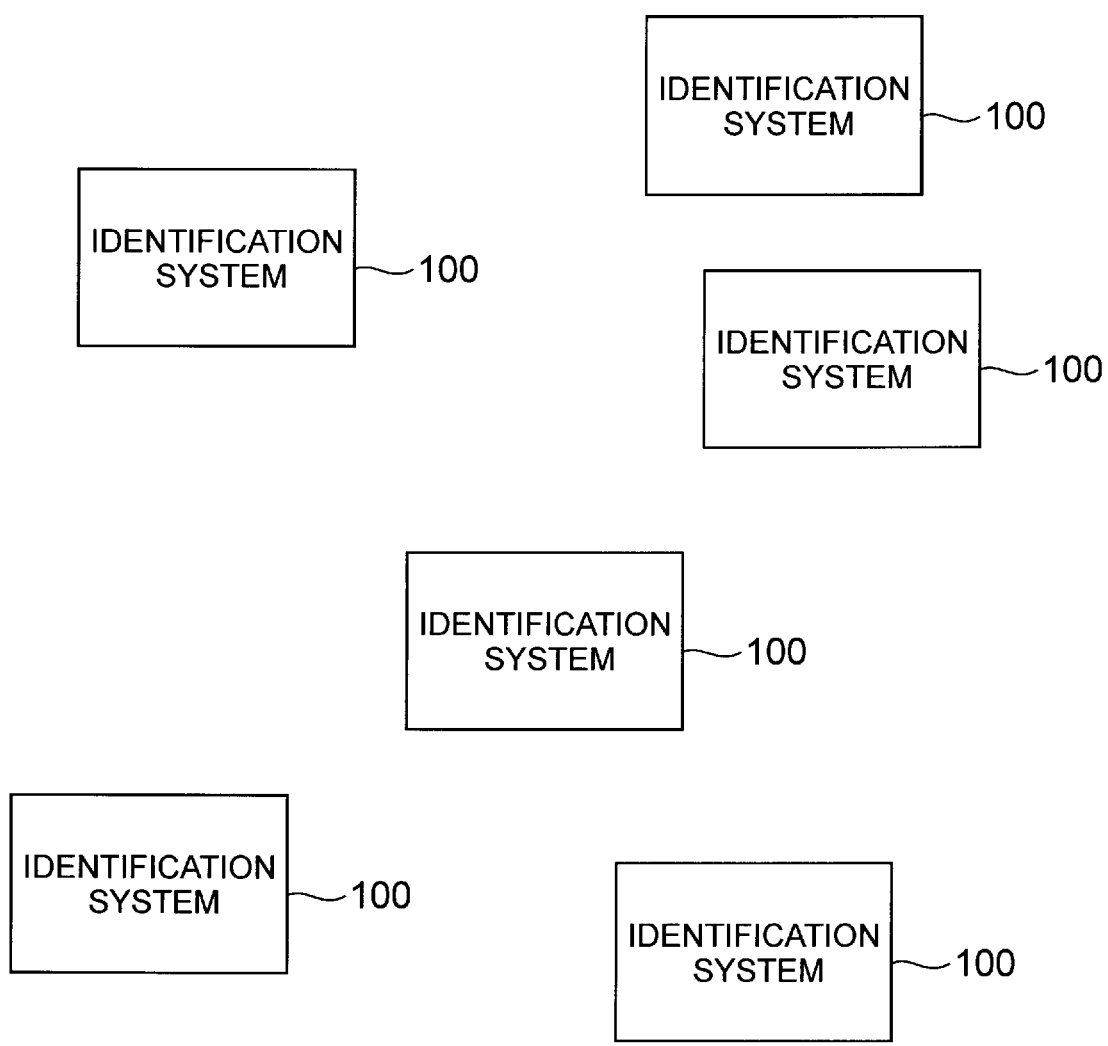
FIG. 1 It depicts a schematic diagram illustrating a situation in which a plurality of identification systems of the present invention is provided.

FIG. 1 is a schematic diagram illustrating a situation in which a plurality of identification systems of the present invention is provided. Although FIG. 1 illustrates a case where six identification systems 100 are provided at each location, the number of identification systems 100 provided at each place is not particularly limited. In each exemplary embodiment, a case where the plurality of identification systems 100 has the same configuration will be described.

Each of the individual identification systems 100 includes a data collection unit (a data collection unit 101 illustrated in FIG. 2 to be described later). The data collection unit (not illustrated in FIG. 1; see FIG. 2 to be described later) of each identification system 100 is installed at each location at which data is collected. The data collection unit collects data at the installation location of the data collection unit. For example, the data collection unit collects image and audio data at the installation location. The data collection unit is realized by a camera or a microphone. For example, the data collection unit may collect the image by capturing a surveillance location. For example, the audio data may be collected by recording audio at the installation location.

Each of the individual identification systems 100 includes a computer separately from the data collection unit, and the computer identifies an object indicated by the data (the image, the audio data, or the like).

Figure 2:
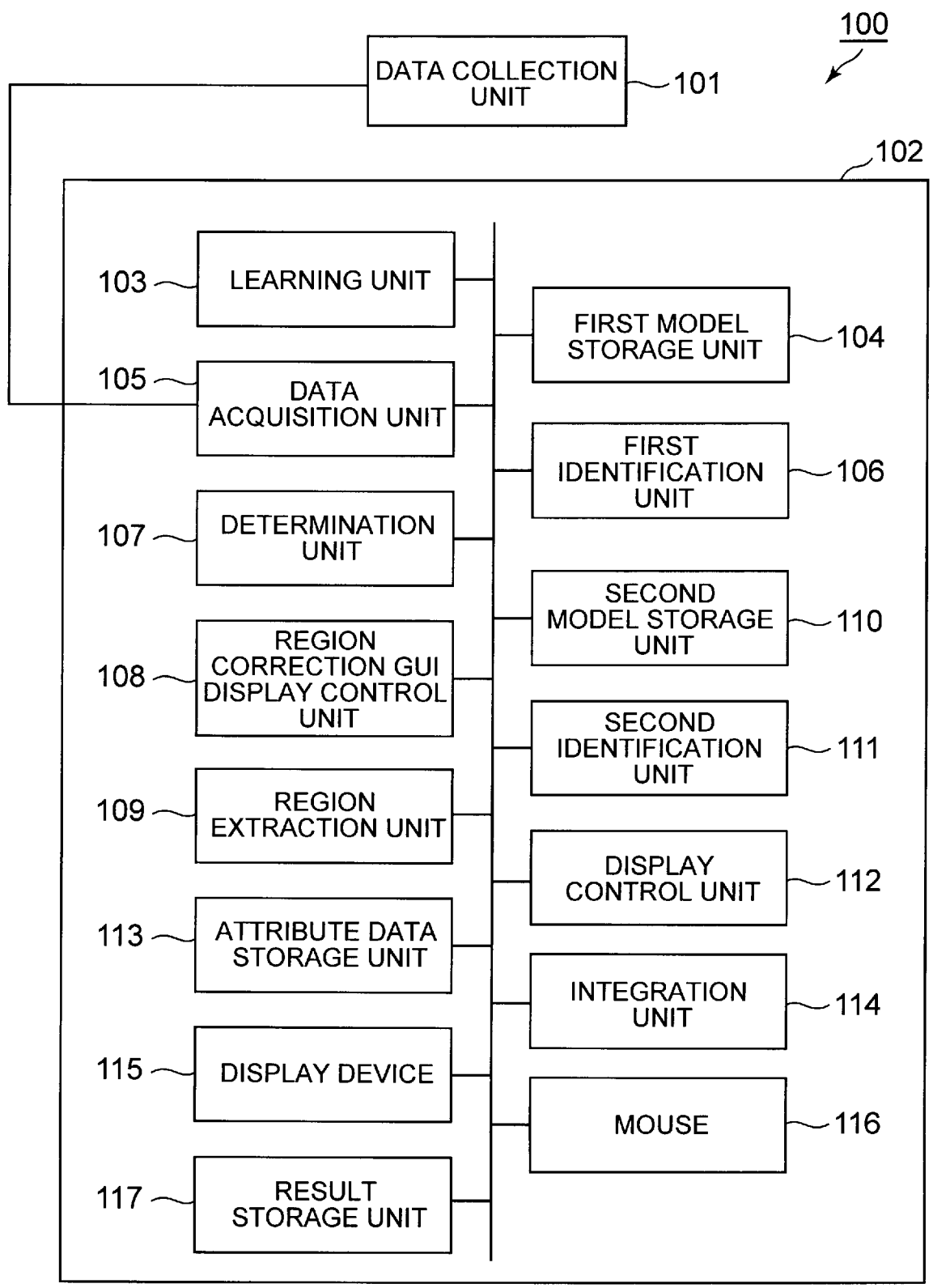
FIG. 2 It depicts a block diagram illustrating a configuration example of an identification system according to a first exemplary embodiment of the present invention.

FIG. 2 is a block diagram illustrating a configuration example of the identification system 100 according to a first exemplary embodiment of the present invention. The identification system 100 includes the data collection unit 101 and a computer 102. The data collection unit 101 and the computer 102 are connected in a wired or wireless manner so as to be able to communicate with each other. In the following description, a case where the data collection unit 101 is a camera will be described as an example, and the data collection unit 101 will be referred to as a camera 101. The camera 101 performs capturing at the installation location of the camera 101. The installation location of the camera 101 and the installation location of the computer 102 may be different from each other.

The computer 102 includes a learning unit 103, a first model storage unit 104, a data acquisition unit 105, a first identification unit 106, a determination unit 107, a region correction graphical user interface (GUI) display control unit 108, a region extraction unit 109, a second model storage unit 110, a second identification unit 111, a display control unit 112, an attribute data storage unit 113, an integration unit 114, a display device 115, a mouse 116, and a result storage unit 117.

The learning unit 103 learns a model by machine learning by using the image captured by the camera 101 as training data. Hereinafter, a case where the learning unit 103 learns a model by deep learning will be described as an example. The training data is, for example, a set of groups of an image captured by the camera 101 and a label indicating an object appearing in the image. The label may be determined by an operator of the identification system 100. The learning is to learn (generate) the model by using such a set of groups as the training data.

When a predetermined image and a label for the image are specified, the learning unit 103 adds the group of the image and the label to the training data, and re-learns the model by deep learning. The predetermined image is an image determined by the determination unit 107 to be described later to cause the second identification unit 111 to execute identification processing. In the present exemplary embodiment, a case where a region in which the object appears is extracted from the image determined in this manner and a group of the image of the extracted region and the label is added to the training data will be described as an example.

Hereinafter, the model generated by the learning performed by the learning unit 103 may be referred to as an internal generation model. As will be described later, the second model storage unit 110 stores models similarly generated by different identification systems 100. Hereinafter, in order to distinguish from the internal generation model, the models generated by the different identification systems 100 may be referred to as external generation models.

The internal generation model and the external generation model are models for identifying an object appearing in a given new image. Hereinafter, a case where any of the internal generation model and the external generation model is a model for determining whether the object appearing in the image is an "automobile", a "motorcycle", a "bus", or a "background (that is, the automobile, the motorcycle, or the bus does not appear)" will be described. When such a model is learned, the operator determines, as the label paired with the image in the training data, any one of the "automobile", the "motorcycle", the "bus", and the "background" for each image. Even when the external generation model is generated by the different identification system 100, the operator of the different identification system 100 determines, as the label paired with the image in the training data, any one of the "automobile", the "motorcycle", the "bus", and the "background" for each image.

Although a case where the first identification unit 106 determines whether the object appearing in the image is the "automobile", the "motorcycle", the "bus", or the "background" by using the model will be described in the present exemplary embodiment, targets to be determined by using the model are not limited to the "automobile", the "motorcycle", the "bus", and the "background". The operator may prepare training data corresponding to the purpose of identification processing, and may cause the learning unit 103 to learn the model by using the training data. The targets ("automobile", "motorcycle", "bus", and "background" in this example) that are determined by using the model are common to the identification systems 100.

The learning unit 103 stores the internal generation model generated by deep learning in the first model storage unit 104. The first model storage unit 104 is a storage device that stores the internal generation model.

Figure 3:
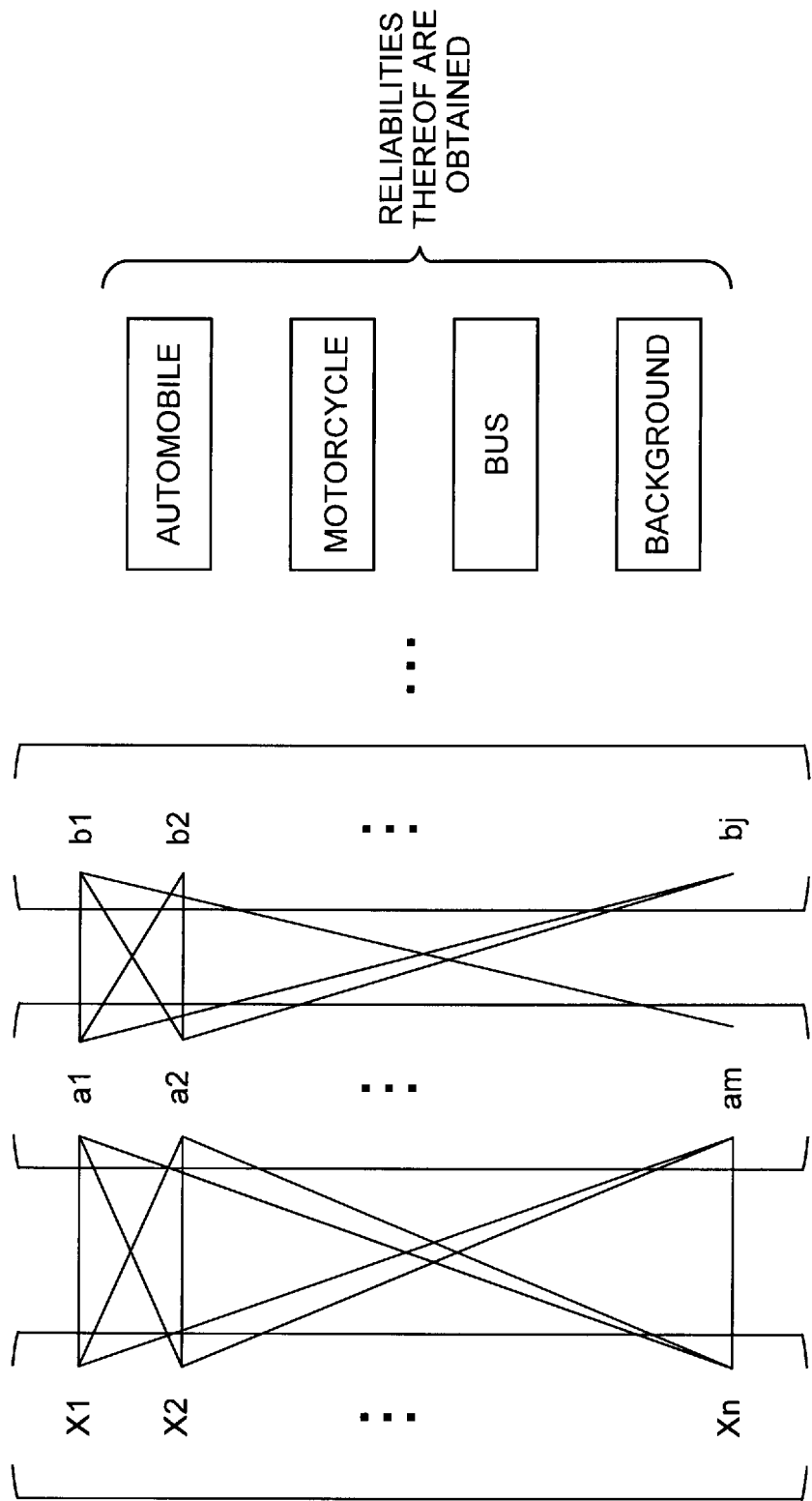
FIG. 3 It depicts a schematic diagram illustrating an example of an internal generation model and an external generation model.

FIG. 3 is a schematic diagram illustrating an example of the internal generation model and the external generation model. When the number of pixels of the image to be applied to the model is n, the image can be represented as a vector $(X1, X2, \ldots, Xn)^T$ having pixel values of n pixels as elements. For example, X1 represents a pixel value of a first pixel in the image. The same applies to X2 to Xn. Here, T means a transposition. The model has a plurality of layers, and includes a plurality of coefficients for each layer. In the example illustrated in FIG. 3, a first layer includes coefficients a1 to am, and a second layer includes coefficients b1 to bj. The individual elements X1 to Xn of the vector representing the image are associated with the respective coefficients a1 to am of the first layer. In FIG. 3, this association is represented by lines. The respective coefficients of a certain layer are associated with the coefficients of the next layer. In FIG. 3, this association is also represented by lines. Weights are determined between the associated elements. For example, the weights are respectively assigned to the associated a1 and b1, the associated a1 and b2, and the like.

The learning unit 103 determines the number of layers, the number of coefficients included in each layer, the value of each of the individual coefficients of each layer, and the value of the weight between the associated elements by performing deep learning by using the training data. The determination of these values corresponds to the generation of the internal generation model.

When the pieces of training data are different, the number of layers, the number of coefficients included in each layer, a value of each of the individual coefficients in each layer, and a value of a weight between associated elements are changed. Accordingly, the internal generation model and the external generation model can be represented as in the form illustrated in FIG. 3, but the number of layers, the number of coefficients included in each layer, the value of each of the individual coefficients in each layer, and the value of the weight between the associated elements are different between the internal generation model and the external generation model. As will be described later, in the present exemplary embodiment, the second model storage unit 110 stores the individual external generation models learned by the plurality of different identification systems 100. Since the individual external generation models are also generated based on different pieces of training data in different identification systems 100, the number of layers and the like are different for the external generation models.

The data acquisition unit 105 acquires a new image captured by the camera 101 from the camera 101. The data acquisition unit 105 is an interface for receiving the image from the camera 101.

When the data acquisition unit 105 acquires the new image from the camera 101, the first identification unit 106 identifies the object indicated by the image by applying the image to the internal generation model stored in the first model storage unit 104. In this example, the first identification unit 106 determines whether the object appearing in the image is the "automobile", the "motorcycle", or the "bus" or only the "background" appears by applying the image to the internal generation model.

When the image is obtained, the vector $(X1, X2, \ldots, Xn)^T$ representing the image is determined. The first identification unit 106 calculates reliabilities of the "automobile", "motorcycle", the "bus", and the "background" by the calculation using the vector $(X1, X2, \ldots, Xn)^T$, the coefficients of each layer included in the internal generation model, and the weights included in the model. The first identification unit 106 determines, as the label indicating the object appearing in the image, the label having the highest reliability among the "automobile", the "motorcycle", the "bus", and the "background". For example, as a result of the first identification unit 106 applying the vector representing the image to the model, the reliabilities of the "automobile", the "motorcycle", the "bus", and the "background" are obtained as "0.6", "0.2", "0.1", and "0.1". In this case, the first identification unit 106 identifies that the object appearing in the image is the "automobile" with the highest reliability "0.6". When the determined label is other than "background", the first identification unit 106 determines a rectangular region surrounding the object ("automobile", "motorcycle", or "bus") appearing in the image by the calculation using the vector representing the image and the internal generation model. A case where the determined label is the "background" means that it is determined that the object does not appear in the image, and in this case, the first identification unit 106 does not determine the rectangular region surrounding the object appearing in the image.

The first identification unit 106 stores the image as a target used in the identification processing, the label corresponding to the identification result, the reliability corresponding to the label in association with each other in the result storage unit 117. For example, as described in the above-described example, the first identification unit 106 determines that the object appearing in the image is the "automobile" having the highest reliability "0.6". In this case, the first identification unit 106 stores the image, the label "automobile", and the reliability "0.6" in association with each other in the result storage unit 117. The result storage unit 117 is a storage device that stores the identification result and the like. However, the result storage unit 117 additionally stores information indicating the rectangular region in the image as will be described later.

The second model storage unit 110 is a storage device that stores a model different from the internal generation model (the model generated by the learning unit 103). More specifically, the second model storage unit 110 stores models (external generation models) generated by the different identification systems 100. In the present exemplary embodiment, a case where the second model storage unit 110 stores the individual external generation models learned by the plurality of different identification systems 100 will be described as an example. Each of the individual models stored in the second model storage unit 110 is represented in the same form as the model schematically illustrated in FIG. 3.

An administrator of the identification system 100 may determine which different identification system 100 to store the model generated from in the second model storage unit 110. For example, the administrator manages the plurality of identification systems 100. However, all the identification systems 100 do not have to be managed by the same administrator. For example, the administrator who manages the plurality of identification systems 100 including the identification system 100 illustrated in FIG. 2 may select some identification systems 100 from the plurality of identification systems 100 managed by the administrator himself, and may store, as the external generation models, the models generated by the selected identification systems 100 in the second model storage unit 110 of the identification system 100 illustrated in FIG. 2.

The second identification unit 111 identifies an object appearing in a predetermined image by applying the predetermined image among images as identification targets used by the first identification unit 106 to the external generation model stored in the second model storage unit 110. The second identification unit 111 executes this processing for each of the individual external generation models. The second identification unit 111 calculates the reliabilities of the "automobile", the "motorcycle", the "bus", and the "background" by applying the predetermined image to the external generation model. The second identification unit 111 determines, as the label indicating the object appearing in the image, the label having the highest reliability among the "automobile", the "motorcycle", the "bus", and the "background".

The predetermined image among the images as the identification targets used by the first identification unit 106 is an image determined by the determination unit 107 to cause the second identification unit 111 to execute the identification processing among the images as the identification targets used by the first identification unit 106.

The determination unit 107 determines an image on which the second identification unit 111 executes the identification processing among the images as the identification targets used by the first identification unit 106. Hereinafter, three types of determination methods will be described as examples of the method of determining, by the determination unit 107, the image on which the second identification unit 111 executes the identification processing among the images as the identification targets used by the first identification unit 106. The determination unit 107 may employ only one determination method of the following three types of determination methods. Alternatively, the determination unit 107 may employ a plurality of determination methods of the following three types of determination methods. In this case, when it is determined to cause the second identification unit 111 to execute the identification processing on a certain image by any one determination method of the plurality of determination methods, the determination unit 107 confirms to cause the second identification unit 111 to execute the identification processing on this image.

[First Determination Method]

Figure 4:
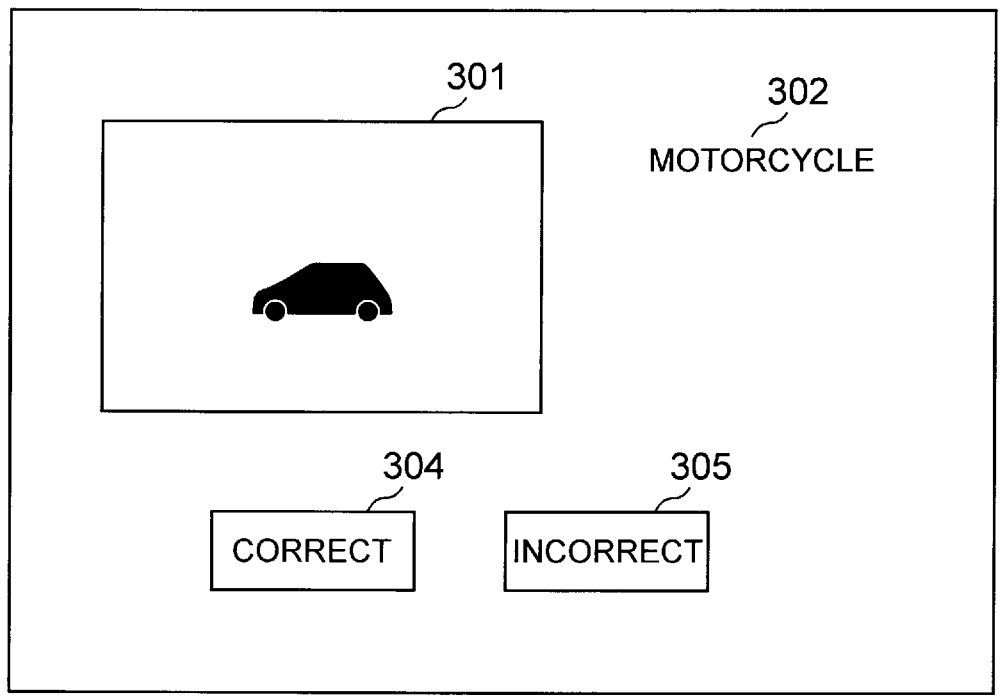
FIG. 4 It depicts a schematic diagram illustrating an example of a screen displayed on a display device by a determination unit in a first determination method.

A first determination method is a method for determining, by the determination unit 107, to cause the second identification unit 111 to execute the identification processing on the image when the label determined by the first identification unit 106 as the label indicating the object appearing in the image is incorrect. That is, the first determination method is a method for determining, by the determination unit 107, to cause the second identification unit 111 to execute the identification processing on the image incorrectly identified by the first identification unit 106. Whether or not the label determined by the first identification unit 106 is incorrect may be determined by, for example, the operator of the identification system 100. Hereinafter, this case will be described as an example. When the first identification unit 106 determines the label for the image, the determination unit 107 displays a screen representing the image, the label determined for the image, and GUIs (referred to as two buttons in this example) through which the operator inputs whether or not the label is correct on the display device 115. FIG. 4 is a schematic diagram illustrating an example of a screen displayed on the display device 115 by the determination unit 107 in the first determination method.

When the first identification unit 106 determines the label for the image, the determination unit 107 displays a screen representing an image 301 as the identification target used by the first identification unit 106, a label 302 ("motorcycle" in the example illustrated in FIG. 4) determined by the first identification unit 106, a first button 304, and a second button 305 on the display device 115 as illustrated in FIG. 4. The first button 304 is a button for inputting that the label for the image is correct, and a case where the first button 304 is clicked means that the operator inputs information indicating that the label for the image is correct. The second button 305 is a button for inputting that the label for the image is incorrect, and a case where the second button 305 is clicked means that the operator inputs information indicating that the label for the image is incorrect. In the example illustrated in FIG. 4, the automobile appears in the image 301 but the "motorcycle" is displayed as the label determined by the first identification unit 106. Accordingly, the operator clicks the second button 305 by using the mouse 116. In the example illustrated in FIG. 4, when the "automobile" is displayed as the label determined by the first identification unit 106, the operator clicks the first button 304.

When the second button 305 is clicked on the screen illustrated in FIG. 4, the determination unit 107 determines that the label determined by the first identification unit 106 is incorrect, and determines to cause the second identification unit 111 to execute the identification processing on the image 301 as the identification target used by the first identification unit 106.

When the first button 304 is clicked, the determination unit 107 determines not to cause the second identification unit 111 to execute the identification processing on the image 301 as the identification target used by the first identification unit 106.

[Second Determination Method]

A second determination method is a method of determining, by the determination unit 107, to cause the second identification unit 111 to execute the identification processing on the image when the reliability corresponding to the label determined for the image is equal to or less than a predetermined threshold value.

That is, when the reliability corresponding to the label determined for the image by the first identification unit 106 is equal to or less than the threshold value, the determination unit 107 determines to cause the second identification unit 111 to execute the identification processing on the image. When the reliability corresponding to the label determined for the image by the first identification unit 106 exceeds the threshold value, the determination unit 107 determines not to cause the second identification unit 111 to execute the identification processing on the image. The threshold value is, for example, "0.5", but may be a value other than "0.5".

In the second determination method, the determination unit 107 determines whether or not to cause the second identification unit 111 to execute the identification processing on the image by comparing the reliability derived by the first identification unit 106 with the threshold value. Accordingly, in the second determination method, it is not necessary to display the screen illustrated in FIG. 4.

[Third Determination Method]

A third determination method is a method of determining, by the determination unit 107, to cause the second identification unit 111 to execute the identification processing on the image when the "automobile", the "motorcycle", or the "bus" appears in the image even though the label determined for the image by the first identification unit 106 is the "background". In other words, in the third determination method, even though the first identification unit 106 determines that the "automobile", the "motorcycle", and the "bus" do not appear in the image, when the "automobile", "motorcycle", or "bus" appears in the image, the determination unit 107 determines to cause the second identification unit 111 to execute the identification processing on the image. When the specified label is the "background", the operator of the identification system 100 determines whether or not the "automobile" or the like appears in the image.

Figure 5:
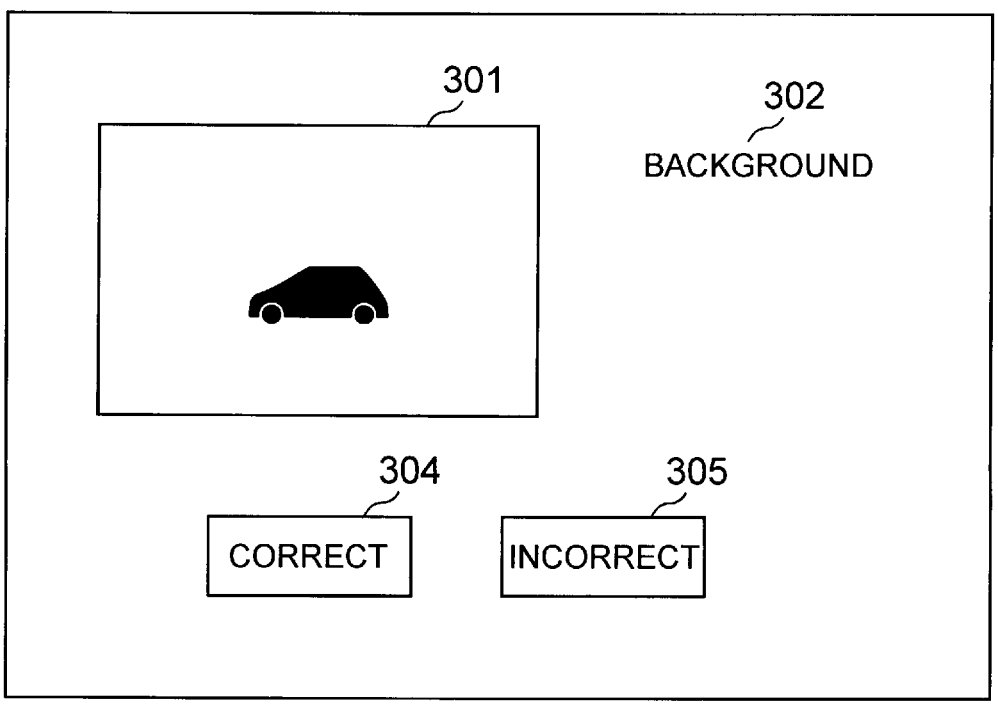
FIG. 5 It depicts a schematic diagram illustrating an example of a screen displayed on the display device by the determination unit in a third determination method.

In the third method, when the "background" is determined as the label for the image, the determination unit 107 displays the screen representing the image, the label "background", and the above-described first button 304 and second button 305 on the display device 115. FIG. 5 is a schematic diagram illustrating an example of a screen displayed on the display device 115 by the determination unit 107 in the third determination method.

When the first identification unit 106 determines the "background" as the label for the image, the determination unit 107 displays the screen representing the image 301 as the identification target used by the first identification unit 106, the label 302, the first button 304, and the second button 305 on the display device 115 as illustrated in FIG. 5. On the screen displayed by the third determination method, the "background" is displayed as the label 302. The first button 304 and the second button 305 are the same as the first button 304 and the second button 305 illustrated in FIG. 4, and thus, the description thereof will be omitted.

In the example illustrated in FIG. 5, even though the label determined for the image 301 by the first identification unit 106 is the "background (the automobile, the motorcycle, and the bus do not appear)", the automobile appears in the image 301. Accordingly, the operator clicks the second button 305 by using the mouse 116. When the automobile, the motorcycle, and the bus do not appear in the image 301, the operator clicks the first button 304.

When the second button 305 is clicked on the screen illustrated in FIG. 5, the determination unit 107 determines that the label "background" is specified but any of the "automobile", the "motorcycle", and the "bus" appears in the image, and determines to cause the second identification unit 111 to execute the identification processing on the image.

When the first button 304 is clicked on the screen illustrated in FIG. 5, the determination unit 107 determines that the "automobile", the "motorcycle", and the "bus" do not appear in the image and the label "background" is correct, and determines not to cause the second identification unit 111 to execute the identification processing on the image.

Next, the region correction GUI display control unit 108 will be described. As described above, when the label determined for the image is other than the "background", the first identification unit 106 determines the rectangular region surrounding the object ("automobile", "motorcycle", or "bus") appearing in the image. The region correction GUI display control unit 108 displays the image determined by the determination unit 107 to cause the second identification unit 111 to execute the identification processing together with the rectangular region on the display device 115, and displays a screen representing a GUI for correcting the rectangular region on the display device 115. However, since the label of "background" is determined for the image determined by the above-described third method, the rectangular region is not determined. In this case, the region correction GUI display control unit 108 does not display the rectangular region.

Figure 6:
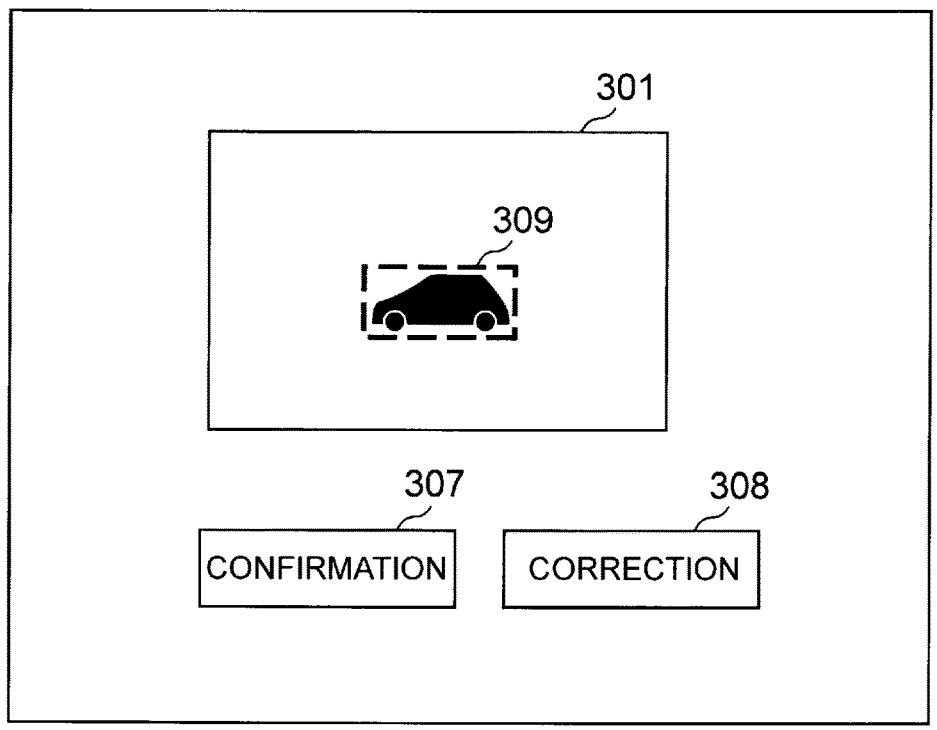
FIG. 6 It depicts a schematic diagram illustrating an example of a screen displayed on the display device by a region correction GUI display control unit.

FIG. 6 is a schematic diagram illustrating an example of a screen displayed on the display device 115 by the region correction GUI display control unit 108. A rectangular region 309 illustrated in FIG. 6 is a rectangular region determined by the first identification unit 106 as a region surrounding the "automobile" in the image 301. The region correction GUI display control unit 108 includes a confirmation button 307 and a correction button 308 in the screen. The confirmation button 307 is a button for the operator to instruct that the displayed rectangular region is to be confirmed. The correction button 308 is a button for the operator to instruct that the correction of the rectangular region 309 is to be received.

In the example illustrated in FIG. 6, the rectangular region 309 is appropriate as the rectangular region surrounding the "automobile" in the image 301. When the operator performs such a determination, the operator clicks the confirmation button 307. When the confirmation button 307 is clicked, the region extraction unit 109 confirms the rectangular region 309 in the image 301 at this point in time.

Figure 7:
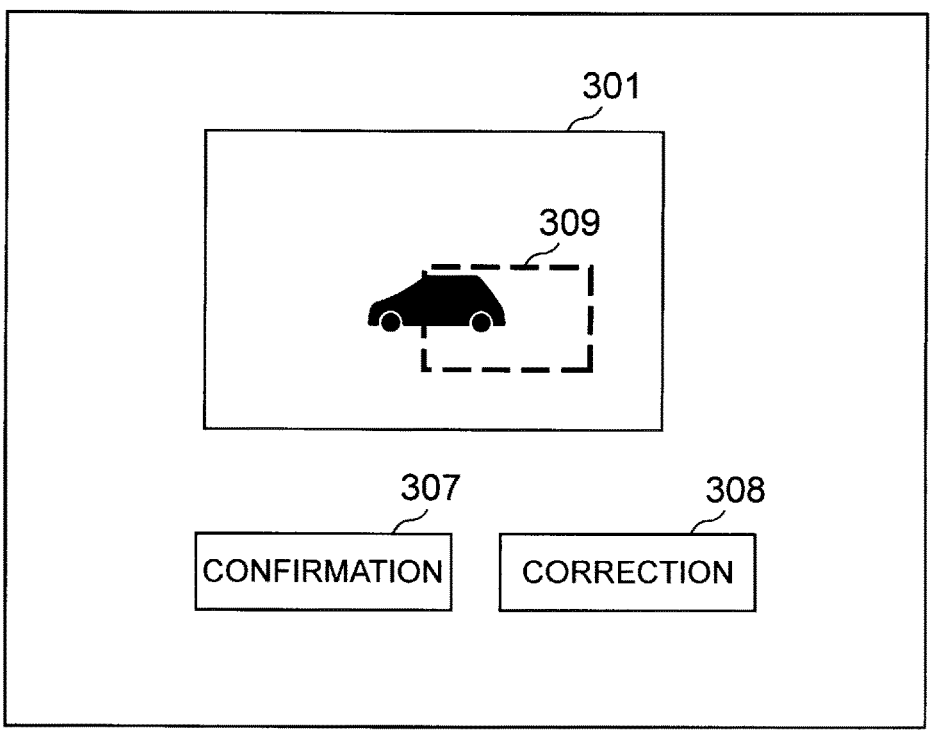
FIG. 7 It depicts a schematic diagram illustrating another example of the screen displayed on the display device by the region correction GUI display control unit.

FIG. 7 is a schematic diagram illustrating another example of the screen displayed on the display device 115 by the region correction GUI display control unit 108. In the example illustrated in FIG. 7, the rectangular region 309 is not appropriate as the rectangular region surrounding the "automobile" in the image 301. In this case, the region correction GUI display control unit 108 receives the rectangular region appropriate as the rectangular region surrounding the "automobile" according to an operation of the operator. When the inappropriate rectangular region 309 illustrated in FIG. 7 is displayed, the operator clicks the correction button 308. After the correction button 308 is clicked, the region correction GUI display control unit 108 receives correction of positions of vertices and sides of the rectangular region 309 according to an operation of the operator using the mouse 116. The operator can correct the rectangular region 309 to an appropriate position and size as illustrated in FIG. 6 by correcting the positions of the vertices and sides. The region correction GUI display control unit 108 receives such correction. The operator clicks the confirmation button 307 after correcting the rectangular region 309 to an appropriate position and size surrounding the object (in this example, "automobile") appearing in the image 301. As described above, when the confirmation button 307 is clicked, the region extraction unit 109 confirms the rectangular region 309 in the image 301 at this point in time. In this example, the region extraction unit 109 confirms the correct rectangular region 309.

Further, as already described, since the label of "background" is determined for the image determined by the above-described third method, the rectangular region is not determined. In this case, the region correction GUI display control unit 108 does not display the rectangular region 309 on the screen illustrated in FIG. 6. In this case, when the operator clicks the correction button 308, the region correction GUI display control unit 108 displays the rectangular region 309 with any size at any location on the image 301 and receives the correction of the positions of the vertices and sides of the rectangular region 309 according to an operation of the operator using the mouse 116. The operator may click the confirmation button 307 after correcting the displayed rectangular region 309 to an appropriate position and size surrounding the object appearing in the image 301. When the confirmation button 307 is clicked, the region extraction unit 109 confirms the rectangular region 309 in the image 301 at this point in time.

As described above, when the confirmation button 307 is clicked, the region extraction unit 109 confirms the rectangular region 309 in the image 301 at this point in time. The region extraction unit 109 extracts the confirmed rectangular region from the image. This rectangular region is a region surrounding the object appearing in the image. The region extraction unit 109 stores the image stored in the result storage unit 117, the label as the identification result of the first identification unit 106, and the reliability corresponding to the label in association with each other in the result storage unit 117 together with information indicating the confirmed rectangular region. The information indicating the rectangular region is, for example, coordinates of each vertex of the rectangular region.

The second identification unit 111 identifies the object appearing in the image of the rectangular region by using the image of the rectangular region extracted by the region extraction unit 109 as the target. The second identification unit 111 executes this processing for each individual external generation model stored in the second model storage unit 110.

The second identification unit 111 calculates the reliabilities of the "automobile", the "motorcycle", the "bus", and the "background" by applying the image of the extracted rectangular region to the external generation model. The second identification unit 111 determines, as the label indicating the object appearing in the image, the label having the highest reliability among the "automobile", the "motorcycle", the "bus", and the "background". The second identification unit 111 stores the reliability obtained for each label, the label indicating the object appearing in the image, and the reliability corresponding to the label in association with the image already stored in the result storage unit 117 in the result storage unit 117. The second identification unit 111 executes this processing for each external generation model. Hereinafter, for the sake of simplification in description, the number of external generation models stored in the second model storage unit 110 is two, one of the two external generation models is denoted by a reference sign "A" and the other one is denoted by a reference sign "B".

In this case, the image, the label determined by the first identification unit 106 performing the identification processing on the image, the reliability corresponding to the label, and the information indicating the confirmed rectangular region in the image are stored in the result storage unit 117. The reliability for each label obtained by the second identification unit 111 applying the image of the rectangular region to the external generation model A, the label having the highest reliability and the reliability corresponding to this label, the reliability for each label obtained by the second identification unit 111 applying the image of the rectangular region to the external generation model B, and the label having the highest reliability and the reliability corresponding to this label are also stored in association with the aforementioned information in the result storage unit 117.

The result storage unit 117 accumulates a set of pieces of information as described above.

However, in the case of the image on which the determination unit 107 determines not to cause the second identification unit 111 to execute the identification processing, the image, the label determined by the first identification unit 106 performing the identification processing on the image, and the reliability corresponding to the label are stored in the result storage unit 117, and the information indicating the rectangular region in the image is not stored.

The display control unit 112 reads a set of one group of information from the information stored in the result storage unit 117, and displays a screen including the image, the label derived by the first identification unit 106 and the reliability corresponding to the label, and the label derived for each external generation model by the second identification unit 111 and the reliability corresponding to this label on the display device 115.

Figure 8:
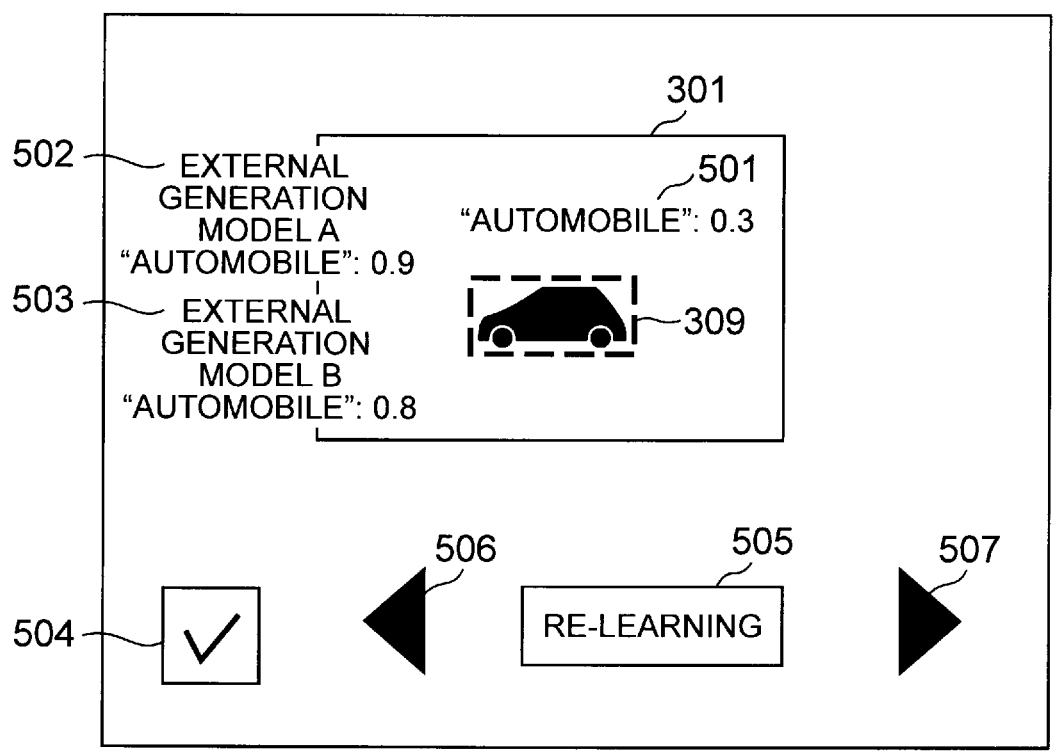
FIG. 8 It depicts a schematic diagram illustrating an example of a screen displayed by a display control unit.

FIG. 8 is a schematic diagram illustrating an example of a screen displayed by the display control unit 112. The display control unit 112 displays a screen on which the label derived by the first identification unit 106 and a reliability 501 corresponding to this label, the label derived by the second identification unit 111 using the external generation model A and a reliability 502 corresponding to this label, the label derived by the second identification unit 111 using the external generation model B and a reliability 503 corresponding to this label are superimposed on the image 301 on the display device 115. In the example illustrated in FIG. 8, the display control unit 112 also displays the confirmed rectangular region 309 so as to be superimposed on the image 301. Although it has been described in this example that the number of external generation models stored in the second model storage unit 110 is two, the number of external generation models may be three or more.

The display control unit 112 displays a check box 504, a re-learning button 505, and screen switching buttons 506 and 507 on this screen.

The check box 504 is a GUI for designating whether or not to add the image 301 displayed in the screen (more specifically, the image of the rectangular region 309 extracted from the image 301) to the training data. A case where the check box 504 is checked means that the image of the rectangular region 309 extracted from the image 301 is added to the training data. A case where the check box 504 is not checked means that the image 301 is not added to the training data. The display control unit 112 may display the check box 504 in a state of being checked in advance according to the reliability derived by using the external generation model. For example, when there are one or more groups in which the reliability is greater than the threshold value (for example, "0.5") in the groups of the label and the reliability derived by using the external generation model, the display control unit 112 may display the check box 504 in a state of being checked in advance. The operator can check the check box 504 or uncheck the check box 504 by clicking the check box 504 with the mouse 116. The operator may determine whether or not to add the image of the rectangular region 309 extracted from the image 301 to the training data by referring to the image 301 and the label and reliability derived for each external generation model. The operator may determine whether or not to check the check box 504 based on the determination.

The screen switching buttons 506 and 507 are buttons for switching between screens for displaying different images. For example, when the screen switching button 506 is clicked, the display control unit 112 switches to the same screen as the screen illustrated in FIG. 8 that includes the previous image of the image 301 in time order. For example, when the screen switching button 507 is clicked, the display control unit 112 switches to the same screen as the image illustrated in FIG. 8 that includes the subsequent image to the image 301 in time order. The operator may determine whether or not to check the check box 504 on each switched screen.

The re-learning button 505 is a button for the operator to instruct the identification system 100 to re-learn the internal generation model. When the re-learning button 505 is clicked, the integration unit 114 specifies the label for each image on the screen with the checked check box 504. In the following description, a case where the check box 504 is checked only on the screen illustrated in FIG. 8 will be described as an example for the sake of simplification in description. In this case, the integration unit 114 specifies the label of the image 301 illustrated in FIG. 8.

Before processing of specifying, by the integration unit 114, the label of one image is described, the attribute data storage unit 113 will be described first. The attribute data storage unit 113 is a storage device that stores data (attribute data) indicating an attribute of the camera 101 connected to the computer 102 including the attribute data storage unit 113 and attribute data of the camera 101 of each identification system 100 that generates each external generation model stored in the second model storage unit 110. The attribute data of the camera 101 of each identification system 100 that generates a certain external generation model is referred to as attribute data corresponding to the external generation model.

The attribute of the camera 101 includes an attribute of the camera 101 itself, an attribute depending on the environment in which the camera 101 is installed, and the like. A value of each attribute is represented by a notification. The administrator of the identification system 100 may determine the value of each attribute in advance depending on the settings and installation environment of the camera 101. The attribute data is represented by a vector of which elements are the values (numerical values) of such attributes.

The attribute data of the camera 101 includes at least values of at least a part of attributes "angle of view of the camera 101", "whether the camera 101 is installed indoors or outdoors", "target to be captured by the camera 101", and "movement direction of the target to be captured by the camera 101". Which attribute value is the element of the attribute data represented by the vector is common to all the identification systems 100, and which attribute value is what number among the elements of the vector is also common to all the identification systems 100. The numerical value that is each element of the vector may be different for each identification system 100.

Since the "angle of view of the camera 101" is represented by the numerical value, the administrator may determine the numerical value representing the angle of view as the element of the vector.

For the attribute "whether the camera 101 is installed indoors or outdoors", for example, when the camera 101 is installed indoors, the value of this attribute may be determined as "0", and when the camera 101 is installed outdoors, the value of this attribute is determined as "1".

For the attribute "target to be captured by the camera 101", for example, when the camera 101 is installed so as to capture vehicles (for example, when the camera 101 is installed toward a roadway), the value of this attribute is determined as "0". When the camera 101 is installed so as to capture pedestrians (for example, when the camera 101 is installed toward a sidewalk), the value of this attribute is determined as "1". When the camera 101 is installed so as to capture both the vehicle and the pedestrian (for example, the camera 101 is installed toward a path through which both the vehicles and the pedestrians pass), the value of this attribute is determined to as "0.5".

For the attribute "movement direction of the target to be captured by the camera 101", a reference axis based on a main axis direction of the camera 101 is determined, and an angle formed by the reference axis and the main movement direction of the target to be captured may be determined as the value of this attribute.

Values of the attributes other than the above-described values may be included in the attribute data. For example, values such as "height of the installation location of the camera 101", "depression angle of the camera 101", and "resolution of the camera 101" may be included in the attribute data. Since all the "height of the installation location of the camera 101", the "depression angle of the camera 101", and the "resolution of the camera 101" are represented by numerical values, these numerical values may be determined as the elements of the vector.

The attribute data storage unit 113 stores the attribute data (vector) of the camera 101 connected to the computer 102 including the attribute data storage unit 113. This attribute data is referred to as reference attribute data. The attribute data storage unit 113 stores the attribute data of the camera 101 of each identification system 100 that generates each external generation model stored in the second model storage unit 110. In the present exemplary embodiment, the second model storage unit 110 stores the external generation model A and the external generation model B. Accordingly, the attribute data storage unit 113 stores attribute data corresponding to the external generation model A (referred to as attribute data A), and attribute data corresponding to the external generation model B (referred to as attribute data B) in addition to the reference attribute data. The attribute data A is attribute data of the camera 101 of the identification system 100 that generates the external generation model A. Similarly, the attribute data B is attribute data of the camera 101 of the identification system 100 that generates the external generation model B.

As described above, the administrator who manages the plurality of identification systems 100 may select some identification systems 100 from the plurality of identification systems 100 managed by the administrator himself, and may store, as the external generation model, the model generated in each selected identification system 100 in the second model storage unit 110 of the identification system 100 illustrated in FIG. 2. At this time, the administrator may store the attribute data of the camera 101 of each selected identification system 100 in the attribute data storage unit 113 of the identification system 100 illustrated in FIG. 2. The administrator may store, as the reference attribute data, the attribute data of the camera 101 in FIG. 2 in the attribute data storage unit 113.

The integration unit 114 integrates the reliabilities of each label derived for the individual external generation models for the image by the second identification unit 111 (in the present exemplary embodiment, the reliabilities of the "automobile", the "motorcycle", the "bus", the "background") for each label, and specifies the label of the image based on the integration result.

At this time, the integration unit 114 calculates a similarity between the reference attribute data (that is, the attribute data of the camera 101 of the identification system 100 including the integration unit 114) and attribute data of the camera 101 of each of the plurality of different identification systems 100 that generates the external generation model A or the external generation model B for each different identification system 100. In the present exemplary embodiment, the integration unit 114 calculates the similarity between the reference attribute data and the attribute data A and the similarity between the reference attribute data and the attribute data B. The similarity between the reference attribute data and the attribute data A is referred to as the similarity corresponding to the external generation model A. The similarity between the reference attribute data and the attribute data B is referred to as the similarity corresponding to the external generation model B.

The attribute data is represented by a vector. When a similarity between two pieces of attribute data (vectors) is calculated, the integration unit 114 may calculate a reciprocal of a distance between the two vectors as the similarity.

When the reliabilities of each label derived for the individual external generation models are integrated for each label, the integration unit 114 integrates the reliabilities by using the similarity corresponding to the external generation model as the weight. The integration unit 114 may specify, as the image label, the label having the highest integration result of the reliabilities.

The calculation of integrating the reliabilities of each label derived for the external generation models for each label will be described in detail. Two calculation methods will be described as the calculation method of integrating, by the integration unit 114, the reliabilities. Here, a case where the reliabilities derived for the external generation models are integrated for one label will be described. The integration unit 114 may integrate the reliabilities derived for the external generation models by performing the same calculation for other labels.

[First Calculation Method]

First, a first calculation method for integrating the reliabilities will be described. It is assumed that Li is the reliability of the label of interest obtained by using an i-th external generation model. The similarity calculated for the i-th external generation model (similarity between the reference attribute data and the attribute data corresponding to the i-th external generation model) is Wi. The number of external generation models stored in the second model storage unit 110 is N. In this case, the integration unit 114 may integrate the reliabilities of the label of interest by the calculation of Expression (1) to be represented below.

[Expression 1]

$$\left(\frac{1}{N}\right) \times \sum_{i=1}^{N} (L_i \times W_i) \tag{1}$$

That is, the integration unit 114 may calculate the product of Li and Wi for each external generation model, and may use an average value of the products as the integration result of the reliabilities of the label of interest. The integration unit 114 performs the same calculation for other labels. The integration unit 114 specifies the label having the highest integration result as the label of the image.

FIG. 9 is an explanatory diagram illustrating a specific example of the first calculation method. It is assumed that there are two external generation models A and B. It is assumed that the reliabilities of the "automobile", the "motorcycle", the "bus", and the "background" derived by using the external generation model A are "0.1", "0.7", "0.1", and "0.1", respectively. It is also assumed that the similarity calculated for the external generation model A is "0.9". The integration unit 114 calculates a result obtained by multiplying each of the above-described reliabilities by the similarity "0.9". As a result, multiplication results (products) of "0.09", "0.63", "0.09", and "0.09" are obtained for the "automobile", the "motorcycle", the "bus", and the "background", respectively.

The reliabilities of the "automobile", the "motorcycle", the "bus", and the "background" derived by using the external generation model B are "0.1", "0.6", "0.2", and "0.1", respectively. It is also assumed that the similarity calculated for the external generation model B is "0.8". The integration unit 114 calculates a result of multiplying each of the above-described reliabilities by the similarity 0.8. As a result, multiplication results (products) of "0.08", "0.48", "0.16", and "0.08" are obtained for the "automobile", the "motorcycle", the "bus", and the "background".

The integration unit 114 calculates the average value of the multiplication results (products) obtained for each of the "automobile", the "motorcycle", the "bus", and the "background". The average values calculated for the "automobile", the "motorcycle", the "bus", and the "background" are "0.085", "0.555", "0.125", and "0.085". Accordingly, the integration unit 114 specifies the "motorcycle" having the highest average value (integration result) as the image label.

[Second Calculation Method]

Next, a second calculation method for integrating the reliabilities will be described. As in the above-described case, it is assumed that Li is the reliability of the label of interest obtained by using the i-th external generation model. The similarity calculated for the i-th external generation model (similarity between the reference attribute data and the attribute data corresponding to the i-th generation model) is Wi. A total sum of individual similarities calculated for the individual external generation models is Wt. The number of external generation models stored in the second model storage unit 110 is N. The integration unit 114 may calculate Wt by the calculation of Expression (2) to be represented below.

[Expression 2]

$$W_t = \sum_{i=1}^{N} W_i \quad (2)$$

In this case, the integration unit 114 may integrate the reliabilities of the label of interest by the calculation of Expression (3) to be represented below.

[Expression 3]

$$\sum_{i=1}^{N} \left( L_i \times \left( \frac{W_i}{W_t} \right) \right) \quad (3)$$

That is, the integration unit 114 may calculate a ratio of the similarity corresponding to the external generation model to the total sum of the similarities for each external generation model, may calculate a weighted sum of the reliabilities of the label of interest by using the calculation result of this ratio as the weight, and may use the calculation result as the integration result of the reliabilities of the label of interest. The integration unit 114 performs the same calculation for other labels. The integration unit 114 specifies the label having the highest integration result as the label of the image.

FIG. 10 is an explanatory diagram illustrating a specific example of the second calculation method. It is assumed that there are two external generation models A and B. It is assumed that the reliabilities of the "automobile", the "motorcycle", the "bus", and the "background" derived by using the external generation model A are "0.1", "0.7", "0.1", and "0.1", respectively. It is assumed that the reliabilities of the "automobile", the "motorcycle", the "bus", and the "background" derived by using the external generation model B are "0.1", "0.6", "0.2", and "0.1", respectively. It is assumed that the similarity calculated for the external generation model A is "0.9" and the similarity calculated for the external generation model B is "0.8". In this case, the total sum of the similarities is 0.9+0.8=1.7. Thus, a ratio of the similarity "0.9" corresponding to the external generation model A to the total sum of the similarities "1.7" is "0.9/1.7". A ratio of the similarity "0.8" corresponding to the external generation model B to the total sum of the similarities "1.7" is "0.8/1.7". The integration unit 114 calculates the weighted sum of the reliabilities for each label by using "0.9/1.7" and "0.8/1.7" as the weights, and uses the calculation result as the integrated result of the reliabilities of the label. The integration results of the "automobile", the "motorcycle", the "bus", and the "background" are "0.0999", "0.6528", "0.1470", and "0.0999". Accordingly, the integration unit 114 specifies the "motorcycle" having the highest integration result as the label of the image.

It can be said that both the first calculation method and the second calculation method are calculations of integrating the reliabilities of the label derived for the individual external generation models by using the similarity corresponding to the external generation model as the weight.

When the integration unit 114 specifies the label of the image based on the integration result of the reliabilities of each label, the learning unit 103 extracts the rectangular region confirmed in the image, and adds the group of the image of the rectangular region and the label specified by the integration unit 114 to the existing training data. The learning unit 103 re-learns the internal generation model by deep learning by the training data. Then, the learning unit 103 updates the existing internal generation model stored in the first model storage unit 104 with a new internal generation model generated by re-learning.

The learning unit 103, the first identification unit 106, the determination unit 107, the region correction GUI display control unit 108, the region extraction unit 109, the second identification unit 111, the display control unit 112, and the integration unit 114 are realized by, for example, a central processing unit (CPU) of the computer 102 that operates according to a model re-learning program. For example, the CPU may read the model re-learning program from a program recording medium such as a program storage device of the computer 102, and may operate as the learning unit 103, the first identification unit 106, the determination unit 107, the region correction GUI display control unit 108, the region extraction unit 109, the second identification unit 111, the display control unit 112, and the integration unit 114 according to the model re-learning program. The first model storage unit 104, the second model storage unit 110, the attribute data storage unit 113, and the result storage unit 117 are realized by a storage device included in the computer 102.

Figure 11:
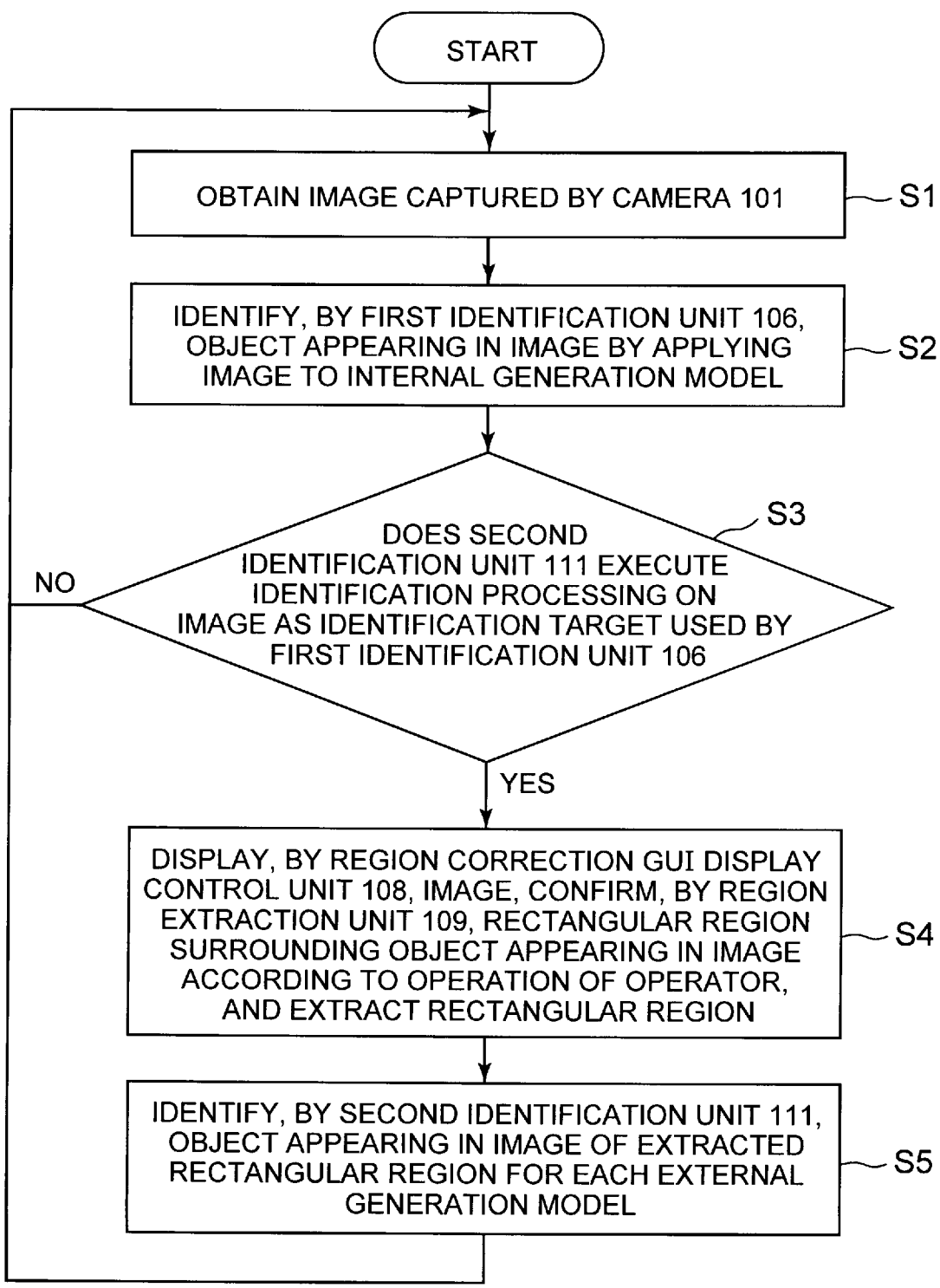
FIG. 11 It depicts a flowchart illustrating an example of a processing progress from when a camera performs capturing to when a second identification unit performs identification processing for an image.

Next, a processing progress of the first exemplary embodiment will be described. FIG. 11 is a flowchart illustrating an example of a processing progress from when the camera 101 performs the capturing to when the second identification unit 111 performs the identification processing on the image. Detailed description of the operations already described will be omitted.

It is assumed that the learning unit 103 learns the internal generation model in advance by deep learning and stores the internal generation model in the first model storage unit 104.

First, the camera 101 obtains an image by performing capturing at the installation location of the camera 101 (step S1). The camera 101 transmits the image to the computer 102.

The first identification unit 106 of the computer 102 receives the image via the data acquisition unit 105. The first identification unit 106 identifies the object appearing in the image by applying the image to the internal generation model (step S2). In step S2, the first identification unit 106 derives the label indicating the object appearing in the image and the reliability of the label. The first identification unit 106 stores the image and the derived label and reliability in association with each other in the result storage unit 117. When the specified label is not the "background", the first identification unit 106 determines the rectangular region surrounding the object appearing in the image.

Subsequently, the determination unit 107 determines whether or not to cause the second identification unit 111 to execute the identification processing on the image as the identification target used by the first identification unit 106 in step S2 (step S3). When it is determined not to cause the second identification unit 111 to execute the identification processing (No in step S3), the processing of step S1 and the subsequent steps are repeated.

When it is determined to cause the second identification unit 111 to execute the identification processing (Yes in step S3), the region correction GUI display control unit 108 displays the image on the display device 115. For example, the region correction GUI display control unit 108 displays the screens illustrated in FIGS. 6 and 7 on the display device 115. The region extraction unit 109 confirms the rectangular region surrounding the object appearing in the image and extracts the rectangular region from the image according to an operation of the operator for the screen (step S4).

Subsequently, the second identification unit 111 identifies the object appearing in the image of the rectangular region extracted in step S4 for each of the individual external generation models stored in the second model storage unit 110 in advance (Step S5). The second identification unit 111 derives the reliabilities of each label ("automobile", "motorcycle", "bus", and "background") for the individual external generation models. The reliabilities of each label derived for the external generation models are stored in the result storage unit 117. The second identification unit 111 stores the group of the label having the highest reliability and the reliability corresponding to the label for each of the individual external generation models in the result storage unit 117. The label having the highest reliability indicates the object determined to appear in the image.

After step S5, the processing of step S1 and the subsequent steps are repeated.

Figure 12:
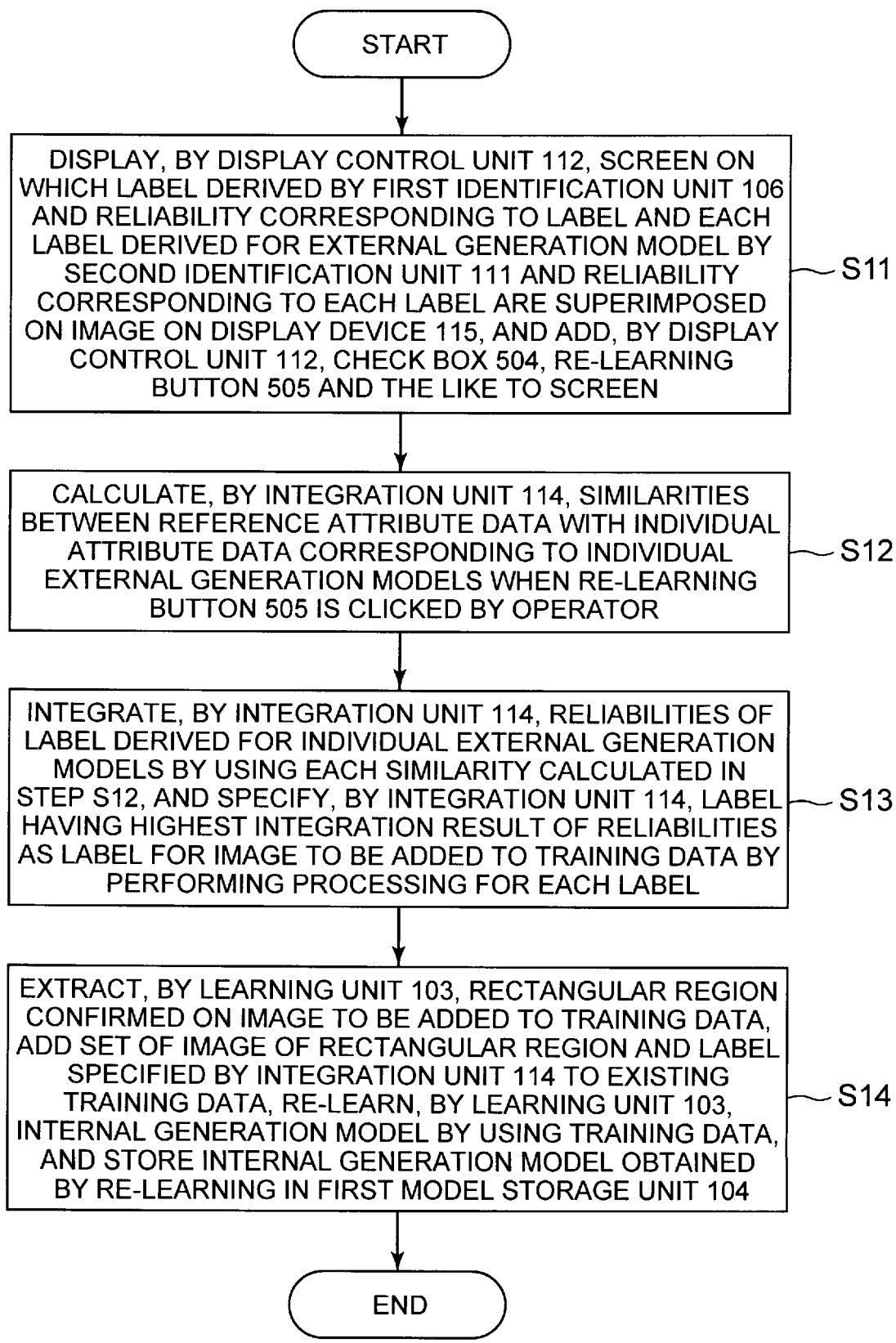
FIG. 12 It depicts a flowchart illustrating an example of a processing progress when the internal generation model is re-learned based on an instruction from an operator.

FIG. 12 is a flowchart illustrating an example of a processing progress in a case where the internal generation model is re-learned based on an instruction from the operator. In the following description, detailed description of the operations already described will be omitted.

The display control unit 112 displays the screen on which the label derived by the first identification unit 106 and the reliability corresponding to the label and each label derived for each external generation model by the second identification unit 111 and the reliability corresponding to each label are superimposed on the image on the display device 115 (step S11). At this time, the display control unit 112 includes the check box 504, the re-learning button 505, and the screen switching buttons 506 and 507 in this screen. In step S11, the display control unit 112 displays, for example, the screen illustrated in FIG. 8.

The operator confirms the screen illustrated in FIG. 8, and determines whether or not to add the displayed image 301 (more specifically, the image of the rectangular region 309 confirmed in the image 301) to the training data. The operator designates that the displayed image 301 is added to the training data by checking the check box 504. That is, the image displayed on the screen with the checked check box 504 is the image designated as the image to be added to the training data. The operator clicks the re-learning button 505 after designating the image to be added to the training data.

When the re-learning button 505 is clicked by the operator, the integration unit 114 calculates the similarities between the reference attribute data and the pieces of individual attribute data corresponding to the individual external generation models (step S12). As described above, the attribute data is represented by the vector. When a similarity between two pieces of attribute data (vectors) is calculated, the integration unit 114 may calculate a reciprocal of a distance between the two vectors as the similarity.

Subsequently, the integration unit 114 integrates the reliabilities of the label derived for the individual external generation models by using each similarity calculated in step S12. The integration unit 114 specifies the label having the highest integration result of the reliabilities as the label for the image to be added to the training data by performing this processing for each label (step S13).

When the operator designates a plurality of images to be added to the training data, the integration unit 114 executes the processing of step S13 for each image.

Subsequently, the learning unit 103 extracts the rectangular region confirmed in the image to be added to the training data, and adds a group of the image of the rectangular region and the label specified by the integration unit 114 to the existing data. The learning unit 103 re-learns the internal generation model by deep learning by using the training data, and stores the internal generation model obtained by re-learning in the first model storage unit 104 (step S14). The learning unit 103 updates the existing internal generation model stored in the first model storage unit 104 with a new internal generation model generated by re-learning.

Thereafter, when the first identification unit 106 identifies the object appearing in the image, a new internal generation model generated by re-learning is used.

According to the present exemplary embodiment, the determination unit 107 determines whether or not to cause the second identification unit 111 to execute the identification processing on the image as the target of the identification processing performed by the first identification unit 106 by at least one method of the aforementioned first determination method, second determination method, and third determination method. Accordingly, the image on which the identification processing is performed by the second identification unit 111 is an image of which the label determined by the first identification unit 106 is incorrect, an image of which the reliability corresponding to the label determined for the image is equal to or less than a threshold value, or an image in which the object ("automobile", "motorcycle", or "bus") appears even though the label determined by the first identification unit 106 is the "background". In the present exemplary embodiment, the learning unit 103 adds a group of a label specified based on a result obtained by applying such an image to a model different from the internal generation model (more specifically, a model (external generation model) generated by the different identification system 100) and this image to the existing training data, and re-learns the internal generation model. Accordingly, the identification accuracy of the internal generation model can be improved.

Next, various modification examples of the first exemplary embodiment will be described.

In the first exemplary embodiment, the region extraction unit 109 confirms the rectangular region surrounding the object appearing in the image, and extracts the rectangular region from the image according to an operation of the operator for the screens illustrated in FIGS. 6 and 7. The second identification unit 111 identifies the object appearing in the image of the extracted rectangular region for each external generation model. The second identification unit 111 may perform processing of identifying the object appearing in the image on not the image of the extracted rectangular region but the entire one image as a target of the processing performed by the first identification unit 106. In this case, the identification system 100 (see FIG. 2) may not include the region correction GUI display control unit 108 and the region extraction unit 109. The identification system 100 may not execute step S4 (see FIG. 11). In step 5, the second identification unit 111 may identify the object appearing in the image by using the entire one image as the target of the processing performed by the first identification unit 106.

The learning unit 103 may add the group of the entire one image and the label specified by the integration unit 114 to the existing training data, and may re-learn the internal generation model by using the training data.

The learning unit 103 may re-learn the internal generation model by deep learning by using the group of the image and the label specified by the integration unit 114 and the existing internal generation model as the training data. This point is the same in a second exemplary embodiment to be described later.

The second model storage unit 110 may store one external generation model. In this case, the learning unit 103 adds the group of the image and the label having the highest reliability derived by the second identification unit 111 to the existing training data, and may re-learn the internal generation model by using the training data.

Second Exemplary Embodiment

Figure 13:
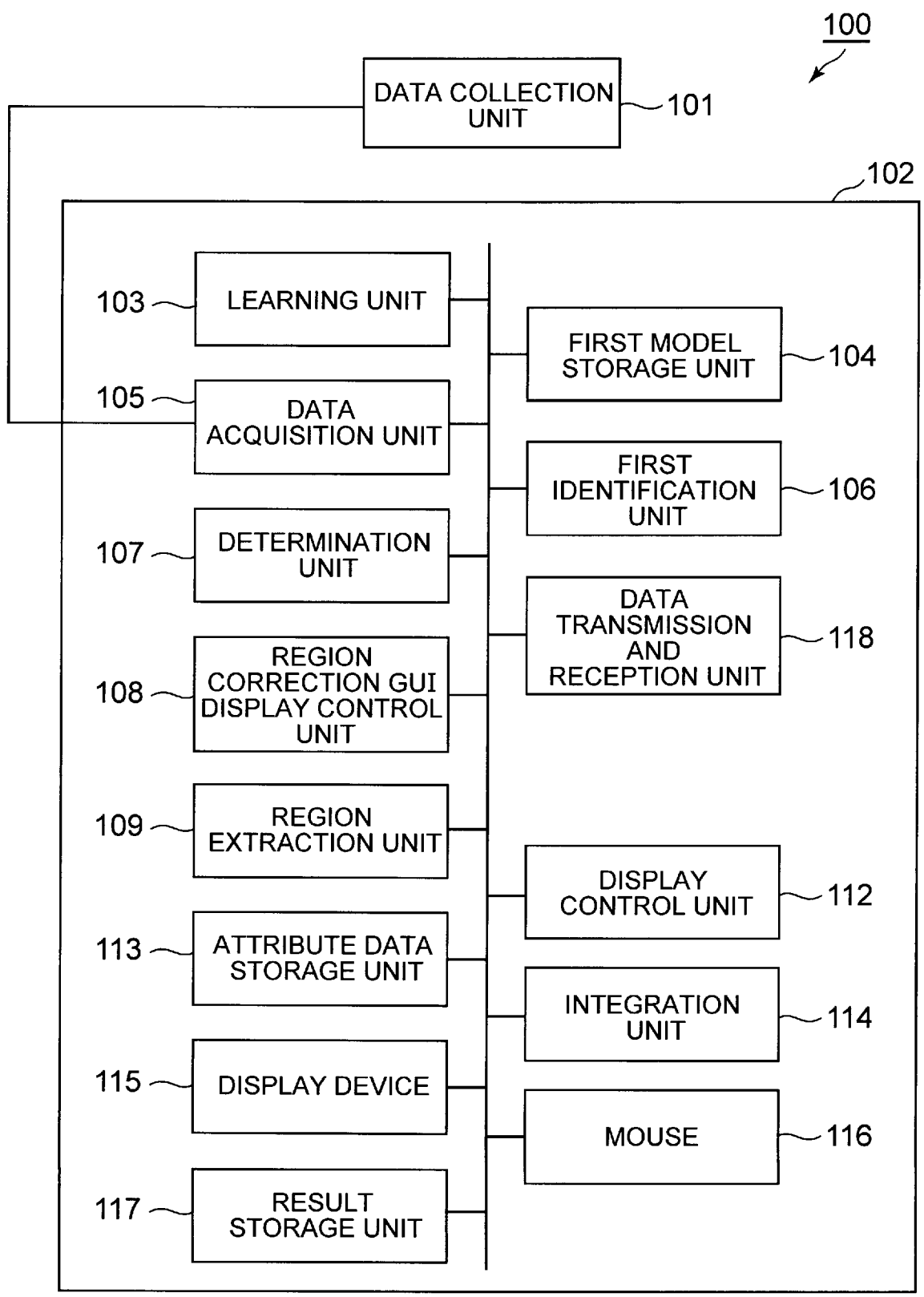
FIG. 13 It depicts a block diagram illustrating a configuration example of an identification system according to a second exemplary embodiment of the present invention.

FIG. 13 is a block diagram illustrating a configuration example of the identification system 100 according to the second exemplary embodiment of the present invention. The same constituent components as the constituent components illustrated in FIG. 2 are designated by the same reference signs as those in FIG. 2, and the description thereof will be omitted.

The computer 102 included in the identification system 100 according to the second exemplary embodiment includes a data transmission and reception unit 118 instead of the second model storage unit 110 and the second identification unit 111 in the first exemplary embodiment.

The data collection unit 101, the learning unit 103, the first model storage unit 104, the data acquisition unit 105, the first identification unit 106, the determination unit 107, the region correction GUI display control unit 108, the region extraction unit 109, the display control unit 112, the attribute data storage unit 113, the integration unit 114, the display device 115, the mouse 116, and the result storage unit 117 are the same as the components in the first exemplary embodiment. In the second exemplary embodiment, a case where the data collection unit 101 is the camera will be described as an example, and the data collection unit 101 is referred to as the camera 101.

The data transmission and reception unit 118 transmits, to a predetermined different identification system 100, the image of the rectangular region extracted by the region extraction unit 109 and a request signal for requesting that the identification processing is to be performed on the image and the reliability for each label and the group of the label having the highest reliability and the reliability thereof are to be sent back. The different identification system 100 serving as a transmission destination of the image and the request signal is determined in advance by the administrator. Here, a case where the administrator determines a plurality of different identification systems 100 serving as the transmission destination of the image and the request signal will be described as an example.

The data transmission and reception unit 118 transmits the image and the request signal to each of the plurality of predetermined different identification systems 100.

Each of the different identification systems 100 that receive the image and the request signal derives the reliability for each label (the reliability for each of the "automobile", the "motorcycle", the "bus", and the "background") by applying the image to the model stored in advance, and specifies the group of the label having the highest reliability and the reliability thereof. The identification system 100 transmits the reliability for each label and the group of the label having the highest reliability and the reliability thereof to the identification system 100 serving as a transmission source of the request signal.

The data transmission and reception unit 118 of the identification system 100 serving as the transmission source of the request signal receives the reliability for each label and the group of the label having the highest reliability and the reliability thereof from each identification system 100 serving the transmission destination of the request signal, and stores the received data in the result storage unit 117.

In the second exemplary embodiment, the administrator may store the attribute data (reference attribute data) of the camera 101 of the identification system 100 including the attribute data storage unit 113 in the attribute data storage unit 113, and may store the attribute data of the camera 101 of each different identification system 100 determined as the transmission destination of the image and the request signal.

In the above-described first exemplary embodiment, the second identification unit 111 (see FIG. 2) performs the identification processing on the image by using the model (external generation model) generated by the different identification system 100. Meanwhile, in the second exemplary embodiment, the data transmission and reception unit 118 (see FIG. 13) transmits the image and the request signal to the different identification system 100, causes the different identification system 100 to perform the identification processing, and receives the result from the different identification system 100. The first exemplary embodiment and the second exemplary embodiment are the same except for this point.

Accordingly, in the second exemplary embodiment, the same effects as those of the first exemplary embodiment can be obtained.

The data transmission and reception unit 118 is realized by, for example, the CPU of the computer 102 that operates according to the model re-learning program and a communication interface of the computer 102. For example, the CPU may read the model re-learning program from the program recording medium such as the program storage device of the computer 102, and may operate as the data transmission and reception unit 118 by using the communication interface according to the model re-learning program.

In the second exemplary embodiment, it is said that the determination unit 107 determines whether or not to cause the different identification system 100 to execute the identification processing on the image as the identification target used by the first identification unit 106. This determination method is the same as the determination method described in the first exemplary embodiment (first determination method, second determination method, and third determination method).

As in the modification example of the first exemplary embodiment, the identification system 100 may not include the region correction GUI display control unit 108 and the region extraction unit 109. In this case, the data transmission and reception unit 118 may transmit the entire one image as the processing target used by the first identification unit 106 and the request signal to the plurality of different identification systems 100. Each of the different identification systems 100 that receive the request signal may identify the object appearing in the image by using the entire one image as the processing target used by the first identification unit 106 as a target.

The learning unit 103 may add the group of the entire one image and the label specified by the integration unit 114 to the existing training data, and may re-learn the internal generation model by using the training data.

One identification system 100 may be determined as the transmission destination of the image and the request signal. In this case, the learning unit 103 may add the group of the image and the label having the highest reliability derived by the identification system 100 to the existing training data, and may re-learn the internal generation model by using the training data.

In the first and second exemplary embodiments, the identification system 100 may perform a series of processing without the operation of the operator. In this case, the determination unit 107 employs the above-described second determination method. That is, when the reliability corresponding to the label determined for the image by the first identification unit 106 is equal to or less than the threshold value, the determination unit 107 determines to cause the second identification unit 111 to execute the identification processing on the image. The region correction GUI display control unit 108 does not display the screens illustrated in FIGS. 6 and 7.

The region extraction unit 109 extracts the rectangular region determined by the first identification unit 106 from the image as it is, and the second identification unit 111 performs the identification processing on the image of the rectangular region for each external generation model. Alternatively, the region extraction unit 109 may not execute the processing of extracting the rectangular region, and the second identification unit 111 may perform the identification processing on the entire one image for each external generation model. The display control unit 112 does not display the image illustrated in FIG. 8. The integration unit 114 and the learning unit 103 may execute the processing of step S12 and the subsequent steps (see FIG. 12) when the second identification unit 111 performing the identification processing on the image for each external generation model. As a result, a series of processing is performed without the operation of the operator.

When the above-described example is applied to the second exemplary embodiment, after the rectangular region determined by the first identification unit 106 is extracted by the region extraction unit 109 as it is, the data transmission and reception unit 118 (see FIG. 13) may transmit the image of the rectangular region and the request signal to the plurality of different identification systems 100, and may receive the result of the identification processing for the image from each of the plurality of identification systems 100. The region extraction unit 109 may not execute the processing of extracting the rectangular region, and the data transmission and reception unit 118 may transmit the entire one image and the request signal to the plurality of different identification systems 100, and may receive the result of the identification processing from each of the plurality of identification systems 100. The integration unit 114 and the learning unit 103 may execute the processing of step S12 and the subsequent steps when the data transmission and reception unit 118 receives the result of the identification processing from each of the plurality of identification systems 100. In this case, a series of processing is performed without the operation of the operator.

Figure 14:
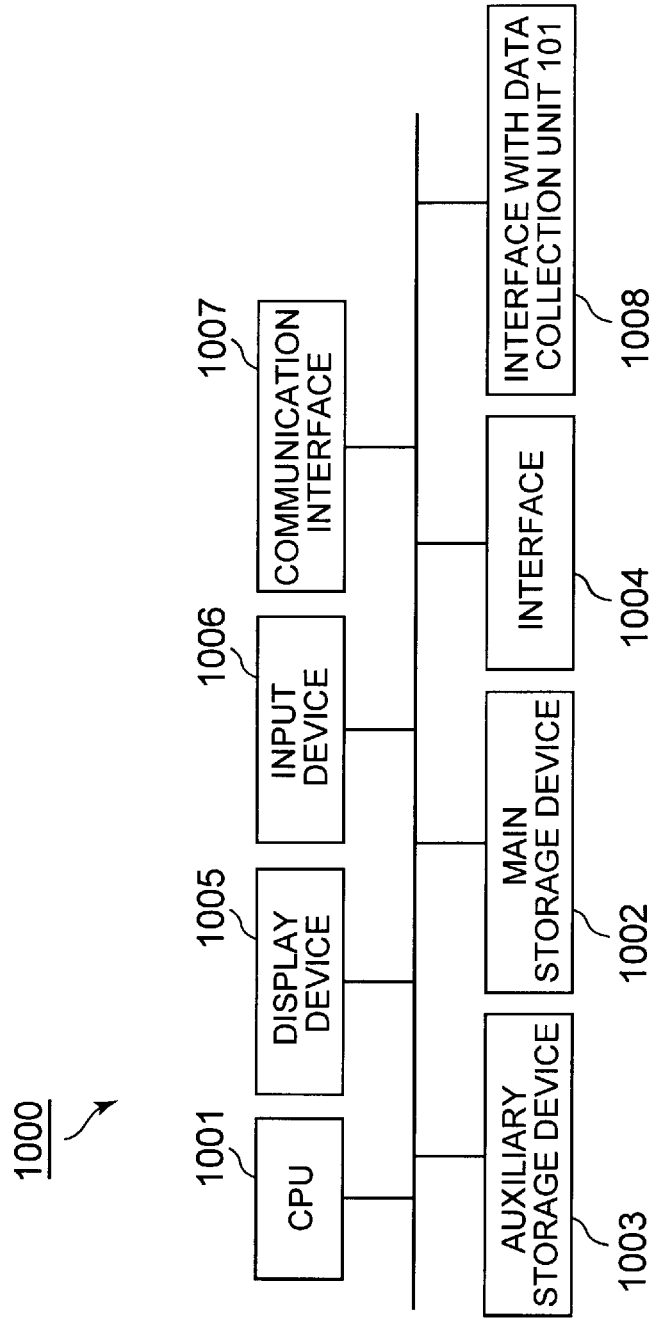
FIG. 14 It depicts a schematic block diagram illustrating a configuration example of a computer included in the identification system in each exemplary embodiment of the present invention.

FIG. 14 is a schematic block diagram illustrating a configuration example of the computer 102 included in the identification system 100 according to each exemplary embodiment of the present invention. In FIG. 14, the computer is denoted by a reference sign "1000". A computer 1000 includes a CPU 1001, a main storage device 1002, an auxiliary storage device 1003, an interface 1004, a display device 1005, an input device 1006, a communication interface 1007, and an interface 1008 with the data collection unit 101 (for example, the camera). The computer included in the identification system 100 of the first exemplary embodiment may not include the communication interface 1007.

The operation of the computer included in the identification system 100 is stored in the auxiliary storage device 1003 in the form of the model re-learning program. The CPU 1001 reads the model re-learning program from the auxiliary storage device 1003, and expands the read program in the main storage device 1002. The CPU 1001 executes the processing of the computer 102 (see FIGS. 2 and 13) illustrated in each exemplary embodiment according to the model re-learning program.

The auxiliary storage device 1003 is an example of a non-transitory tangible medium. As another example of the non-transitory tangible medium, there are a magnetic disk, a magneto-optical disk, a compact disk read only memory (CD-ROM), a digital versatile disk read only memory (DVD-ROM), a semiconductor memory, and the like connected via the interface 1004. When this program is distributed to the computer 1000 via a communication line, the computer 1000 to which the program is distributed may expand the program in the main storage device 1002 and execute the above-described processing.

The program may be used for realizing a part of the processing of the computer 102 illustrated in each exemplary embodiment. The program may be a differential program that realizes the above-described processing in combination with another program already stored in the auxiliary storage device 1003.

A part or all of the constituent components may be realized by a general-purpose or dedicated circuitry, a processor, or a combination thereof. These constituent components may be realized by a single chip, or may be realized by a plurality of chips connected via a bus. A part or all of the constituent components may be realized by a combination of the above-described circuits and a program.

When a part or all of the constituent components are realized by a plurality of information processing devices, circuits, and the like, the plurality of information processing devices, circuits, and the like may be centrally arranged or may be distributedly arranged. For example, the information processing device, the circuit, and the like may be realized as a form in which a client and server system, a cloud computing system, and the like are connected to each other via a communication network.

Figure 15:
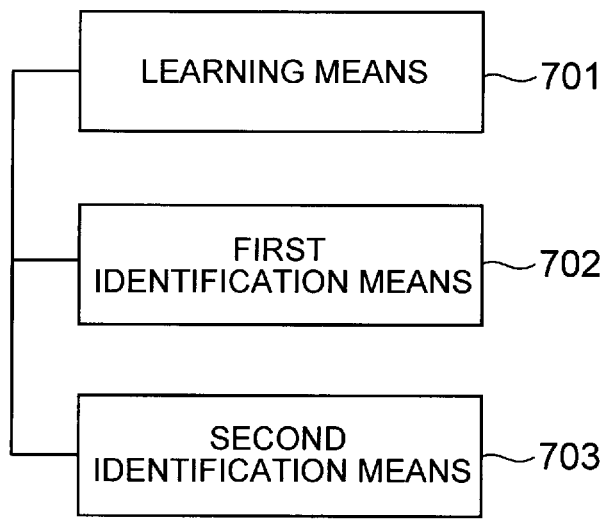
FIG. 15 It depicts a block diagram illustrating an outline of the identification system of the present invention.

Next, an outline of the present invention will be described. FIG. 15 is a block diagram illustrating an outline of the identification system of the present invention. The identification system of the present invention includes learning means 701, first identification means 702, and second identification means 703.

The learning means 701 (for example, the learning unit 103) learns a model for identifying an object indicated by data (for example, an image) by using training data.

The first identification means 702 (for example, the first identification unit 106) identifies the object indicated by the data by using the model learned by the learning means 701.

The second identification means 703 (for example, the second identification unit 111) identifies the object indicated by the data as the identification target used by the first identification means 702 by using a model different from the model learned by the learning means 701.

The learning means 701 re-learns the model by using the training data including the label for the data determined based on the identification result derived by the second identification means 703 and the data.

With such a configuration, the model can be re-learned so as to improve the identification accuracy of the model for identifying the object indicated by the data.

The above-described exemplary embodiments of the present invention can be described as, but not limited thereto, the following appendices.

(Supplementary note 1)

An identification system including learning means for learning a model for identifying an object indicated by data by using training data, first identification means for identifying the object indicated by the data by using the model learned by the learning means, and second identification means for identifying the object indicated by the data as an identification target used by the first identification means by using a model different from the model learned by the learning means, in which the learning means re-learns the model by using training data including a label for the data determined based on an identification result derived by the second identification means and the data.

(Supplementary Note 2)

The identification system according to supplementary note 1, in which the second identification means identifies the object indicated by the data as the identification target used by the first identification means in a predetermined case.

(Supplementary Note 3)

The identification system according to supplementary note 1 or supplementary note 2, in which the second identification means identifies the object indicated by the data as the identification target used by the first identification means by using a model learned by a different identification system.

(Supplementary Note 4)

The identification system according to supplementary note 3 further including model storage means for respectively storing individual models learned by a plurality of different identification systems, in which the second identification means identifies the object indicated by the data as the identification target used by the first identification means for each of the individual models, the identification system further includes integration means for specifying a label for the data by integrating identification results derived from the individual models by the second identification means, and the learning means re-learns the model by using training data including the label specified by the integration means and the data.

(Supplementary Note 5)

The identification system according to supplementary note 4 further including data collection means for collecting data, in which the integration means calculates a similarity between an attribute of the data collection means of the identification system and an attribute of the data collection means of each of the plurality of different identification systems for each different identification system, and integrates the identification results derived for the individual models by the second identification means by weighting the identification results by using the similarity corresponding to the model as a weight.

(Supplementary Note 6)

The identification system according to any one of supplementary note 1 to supplementary note 5, in which the data is an image, when an object indicated by the image is identified, the first identification means determines a region in the image in which the object appears, and the second identification means identifies an object indicated by the region in the image.

(Supplementary Note 7)

The identification system according to supplementary note 6, in which the first identification means derives a label indicating the object indicated by the image and a reliability of the label, the second identification means derives a label indicating the object indicated by the image and a reliability of the label, and the identification system further includes display control means for displaying a screen including the image, the label and the reliability derived by the first identification means, and the label and the reliability derived by the second identification means.

(Supplementary Note 8)

The identification system according to supplementary note 7, in which the display control means displays a screen including the label and the reliability derived by the first identification means, the label and the reliability derived by the second identification means, and a predetermined button, and the learning means re-learns the model when the predetermined button is clicked.

(Supplementary Note 9)

The identification system according to any one of supplementary note 6 to supplementary note 8 further including region correction graphical user interface (GUI) display control means for displaying a GUI which corrects the region of the image determined by the first identification means, in which the second identification means identifies an object indicated by the corrected region.

(Supplementary Note 10)

A model re-learning method including learning a model for identifying an object indicated by data by using training data, executing first identification processing of identifying the object indicated by the data by using the model, executing second identification processing of identifying the object indicated by the data as an identification target used in the first identification processing by using a model different from the model, and re-learning the model by using training data including a label for the data determined based on an identification result derived in the second identification processing and the data.

(Supplementary Note 11)

A model re-learning program causing a computer to execute learning processing of learning a model for identifying an object indicated by data by using training data, first identification processing of identifying the object indicated by the data by using the model learned in the learning processing, second identification processing of identifying the object indicated by the data as an identification target used in the first identification processing by using a model different from the model learned in the learning processing, and re-learning processing of re-learning the model by using training data including a label for the data determined based on an identification result derived in the second identification processing and the data.

Although the present invention has been described with reference to the exemplary embodiments, the present invention is not limited to the above-described exemplary embodiments. Various modifications that can be understood by those skilled in the art can be made to the configurations and details of the present invention within the scope of the present invention.

INDUSTRIAL APPLICABILITY

The present invention is preferably applied to an identification system that identifies an object represented by data by applying the data to a model.

REFERENCE SIGNS LIST

100 Identification system
101 Data collection unit
102 Computer
103 Learning unit
104 First model storage unit
105 Data acquisition unit
106 First identification unit
107 Determination unit
108 Region correction GUI display control unit
109 Region extraction unit
110 Second model storage unit
111 Second identification unit
112 Display control unit
113 Attribute data storage unit
114 Integration unit
115 Display device
116 Mouse
117 Result storage unit
118 Data transmission and reception unit

The invention claimed is:

1. An identification system comprising:
a learning unit that learns a model for identifying an object indicated by data by using training data;
a first identification unit that identifies the object indicated by the data by using the model learned by the learning unit; and
a second identification unit that identifies the object indicated by the data as an identification target used by the first identification unit by using a model different from the model learned by the learning unit,
wherein the learning unit re-learns the model by using training data including a label for the data determined based on an identification result derived by the second identification unit and the data.

2. The identification system according to claim 1, wherein the second identification unit identifies the object indicated by the data as the identification target used by the first identification unit in a predetermined case.

3. The identification system according to claim 1, wherein the second identification unit identifies the object indicated by the data as the identification target used by the first identification unit by using a model learned by a different identification system.

4. The identification system according to claim 3, further comprising:

a model storage unit for respectively stores individual models learned by a plurality of different identification systems,
wherein the second identification unit identifies the object indicated by the data as the identification target used by the first identification unit for each of the individual models,
the identification system further includes
an integration unit that specifies a label for the data by integrating identification results derived from the individual models by the second identification unit, and
the learning unit re-learns the model by using training data including the label specified by the integration unit and the data.

5. The identification system according to claim 4, further comprising:
a data collection for collecting unit that collects data,
wherein the integration unit calculates a similarity between an attribute of the data collection unit of the identification system and an attribute of the data collection unit of each of the plurality of different identification systems for each different identification system, and integrates the identification results derived for the individual models by the second identification unit by weighting the identification results by using the similarity corresponding to the model as a weight.

6. The identification system according to claim 1,
wherein the data is an image,
when an object indicated by the image is identified, the first identification unit determines a region in the image in which the object appears, and
the second identification unit identifies an object indicated by the region in the image.

7. The identification system according to claim 6,
wherein the first identification unit derives a label indicating the object indicated by the image and a reliability of the label,
the second identification unit derives a label indicating the object indicated by the image and a reliability of the label, and
the identification system further includes
a display control unit that displays a screen including the image, the label and the reliability derived by the first identification unit, and the label and the reliability derived by the second identification unit.

8. The identification system according to claim 7,
wherein the display control unit displays a screen including the label and the reliability derived by the first identification unit, the label and the reliability derived by the second identification unit, and a predetermined button, and
the learning unit re-learns the model when the predetermined button is clicked.

9. The identification system according to claim 6, further comprising:
a region correction graphical user interface (GUI) display control unit that displays a GUI which corrects the region of the image determined by the first identification unit,
wherein the second identification unit identifies an object indicated by the corrected region.

10. A model re-learning method comprising:
learning a model for identifying an object indicated by data by using training data;
executing first identification processing of identifying the object indicated by the data by using the model;

executing second identification processing of identifying the object indicated by the data as an identification target used in the first identification processing by using a model different from the model; and re-learning the model by using training data including a label for the data determined based on an identification result derived in the second identification processing and the data.

11. A non-transitory computer-readable recording medium in which a model re-learning program is recorded, the model re-learning program causing a computer to execute:

learning processing of learning a model for identifying an object indicated by data by using training data;

first identification processing of identifying the object indicated by the data by using the model learned in the learning processing;

second identification processing of identifying the object indicated by the data as an identification target used in the first identification processing by using a model different from the model learned in the learning processing; and re-learning processing of re-learning the model by using training data including a label for the data determined based on an identification result derived in the second identification processing and the data.

* * * * *